(12) United States Patent
Shinozaki et al.

(10) Patent No.: US 7,647,155 B2
(45) Date of Patent: Jan. 12, 2010

(54) APPARATUS AND METHOD FOR CALCULATING WORK LOAD ENGINE

(75) Inventors: Koichiro Shinozaki, Saitama (JP); Katsura Okubo, Saitama (JP); Yuji Yasui, Saitama (JP); Masahiro Sato, Saitama (JP); Koichi Ikoma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 136 days.

(21) Appl. No.: 11/663,811

(22) PCT Filed: Sep. 28, 2005

(86) PCT No.: PCT/JP2005/017894

§ 371 (c)(1),
(2), (4) Date: Feb. 19, 2008

(87) PCT Pub. No.: WO2006/035842

PCT Pub. Date: Apr. 6, 2006

(65) Prior Publication Data

US 2008/0294323 A1    Nov. 27, 2008

(30) Foreign Application Priority Data

Sep. 30, 2004    (JP)    ............... 2004-287982

(51) Int. Cl.
*F02D 45/00*    (2006.01)
*F02D 15/02*    (2006.01)
*G01M 15/00*    (2006.01)

(52) U.S. Cl. .................................... 701/102
(58) Field of Classification Search ................ 701/102, 701/101, 115
See application file for complete search history.

(56) References Cited

U.S. PATENT DOCUMENTS 5,255,637 A * 10/1993 Schechter ................. 123/48 R
7,402,916 B2 * 7/2008 Taspinar et al. ............. 290/22

FOREIGN PATENT DOCUMENTS

JP    3-057937 B2    3/1991
JP    7-034958 A    2/1995

* cited by examiner

*Primary Examiner*—Hieu T Vo
(74) *Attorney, Agent, or Firm*—Arent Fox LLP

(57) ABSTRACT

A device and method for calculating the work load of an engine more efficiently and accurately. The device for calculating the work load of an engine comprises a means for determining a desired frequency component to calculate the work load of the engine obtained through frequency decomposition of the volume variation rate of the engine. The device further comprises a first calculating means for calculating a first correlation coefficient between the volume variation rate and a reference signal composed of a frequency corresponding to the determined component, and a second calculating means for calculating a second correlation coefficient between the cylinder inner pressure of the engine and a reference signal composed of a frequency corresponding to the determined component. The work load of the engine is calculated using the first and second correlation coefficients.

36 Claims, 12 Drawing Sheets

(a)

| Fourier Coefficients DC, Cosine Components | Value | Fourier Coefficients sine Components | Value |
|---|---|---|---|
| a0 (DC) | 1.974e-017 | | |
| a1 | -0.06387 | b1 | 4.356 |
| a2 | -0.0187 | b2 | 0.707 |
| a3 | 0.0007413 | b3 | 0.004717 |
| a4 | -2.195e-005 | b4 | -0.002233 |

(b)

(a)

(b)

(a)

(b)

(a)

(b)

(a)

(b)

APPARATUS AND METHOD FOR CALCULATING WORK LOAD ENGINE

CROSS-REFERENCE TO RELATED APPLICATION

This application is a National Stage entry of International Application No. PCT/JP2005107894, filed Sep. 28, 2005, the entire specification claims and drawings of which are incorporated herewith by reference.

TECHNICAL FIELD

The present invention relates to an apparatus and a method for efficiently calculating work performed by an internal-combustion engine.

BACKGROUND ART

Some techniques have been proposed for detecting a pressure within a combustion chamber (referred to as an in-cylinder pressure) of a internal-combustion engine (referred to as an engine) to calculate engine work such as an indicated mean effective pressure based on the detected pressure and a rate of change in the stroke volume of the combustion chamber.

Japanese Patent Application Publication listed below discloses a technique for deriving an equation to be used for calculating an indicated mean effective pressure for an engine having a predetermined structure. This equation uses predetermined frequency components of an in-cylinder pressure signal. In order to extract the predetermined frequency components of the in-cylinder pressure signal, the in-cylinder pressure signal is filtered by a first band-pass filter for extracting a fundamental wave component and a second band-pass filter for extracting higher harmonic wave components that are integral multiples of the fundamental wave component.

DISCLOSURE OF THE INVENTION

Problems to be Solved by the Invention

Conventionally, in order to calculate engine work such as an indicated mean effective pressure, it is required that the in-cylinder pressure is sampled at a higher frequency (for example, at every one degree crank angle). Such a higher sampling frequency makes the calculation load higher, which may be difficult for calculation performed by a control unit (ECU) mounted on a vehicle.

The technique disclosed in the above patent application publication attempts to lower the sampling frequency. More specifically, according to this technique, frequency components required for calculating the indicated mean effective pressure are predetermined. The sampling frequency can be decreased to the point where the predetermined frequency components can be obtained. However, according to this technique, the predetermined frequency components are extracted by using a band-pass filter. It may be difficult for the band-pass filter to accurately extract the predetermined frequency components. If the accuracy of the filtering is improved, the band-pass filter may become unstable. As a result, an error in the filtered in-cylinder pressure signal may be larger.

Further, according to the technique disclosed in the above patent application publication, the equation used for calculating the indicated mean effective pressure is derived assuming that the engine has a predetermined structure. Therefore, it is difficult to apply such an equation to another engine having a structure different from the predetermined structure.

Further, according to the technique disclosed in the above patent application publication, the in-cylinder pressure needs to be sampled at a predetermined angle with respect to the top dead center (TDC) of the intake stroke. Therefore, a time period over which the indicated mean effective pressure is calculated is fixed, cannot be arbitrarily established. On the other hand, in a typical engine, a stroke volume is constant. Therefore, the waveform of a rate of change in the stroke volume (referred to as volume change rate hereinafter) with respect to the crank angle of the engine is constant. Accordingly, engine work such as the indicated mean effective pressure has been conventionally calculated assuming that the waveform of the volume change rate is constant.

In recent years, however, there is proposed an engine where the stroke volume is variable and hence the waveform of the volume change rate with respect to the crank angle of the engine is variable. For example, in an engine with a variable compression ratio mechanism, the stroke volume and the volume change rate can change. When engine work is calculated for such an engine according to the conventional technique, various stroke volumes and volume change rates corresponding to various engine operating conditions need to be pre-stored in a memory, which is enormous amount of data.

Moreover, according to the technique disclosed in the above patent application publication, the equation for calculating the indicated mean effective pressure is derived assuming that the volume change rate is expressed by a predetermined single equation. Because the derived equation does not include any parameter regarding the volume change rate, accurate calculation of the indicated mean effective pressure is difficult for an engine where the waveform of the volume change rate is variable.

Thus, an object of the present invention is to provide an apparatus and a method for calculating engine work in such a manner as to solve the above-described problems.

Means for Solving Problem

According to one aspect of the present invention, a method for calculating work of an engine comprises determining a component desired for determining the engine work, among frequency components that are obtained by frequency-resolving a volume change rate of the engine. The method further comprises determining a first correlation coefficient between the volume change rate and a reference signal that consists of a frequency corresponding to the desired component and a second correlation coefficient between an in-cylinder pressure of the engine and a reference signal that consists of a frequency corresponding to the desired component. The engine work is calculated based on the first and second correlation coefficients.

According to the invention, the second correlation coefficient associated with the in-cylinder pressure is calculated only for the desired component that is determined by frequency-resolving the volume change rate. All of the components are not required for calculating the second correlation coefficient. Consequently, the sampling frequency for the in-cylinder pressure can be decreased to a degree where the desired component can be extracted. Moreover, by using the first and second correlation coefficients, the volume change rate and the in-cylinder pressure at the desired component can be more exactly extracted and the time period for which the engine work is calculated can be arbitrarily established. Furthermore, according to this invention, because the desired component suitable for a given engine can be determined, the engine work of an engine having any structure can be calculated.

According to one embodiment of the invention, the first correlation coefficient is a Fourier coefficient that is obtained by expanding the volume change rate into Fourier series. The second correlation coefficient is a Fourier coefficient that is obtained by expanding the in-cylinder pressure into Fourier series.

According to one embodiment of the invention, a stroke volume of the engine is determined. The engine work is calculated based on the stroke volume, and the first and second correlation coefficients. Thus, the engine work can be more accurately calculated even for an engine whose stroke volume is variable.

According to one embodiment of the invention, an operating condition of the engine is detected. The desired component is determined based on the detected operating condition. Thus, a component desired for calculating the engine work can be appropriately determined in accordance with the operating condition of the engine.

According to one embodiment of the invention, the desired component and the first correlation coefficient are predetermined and stored in a storage device corresponding to the operating condition of the engine. By referring to the storage device based on a detected operating condition of the engine, the desired component and the first correlation coefficient corresponding to the detected operating condition of the engine are extracted. Thus, the calculation load for calculating the engine work can be reduced by predetermining and storing the desired component and the first correlation coefficient. Furthermore, the stroke volume may be predetermined and stored in the storage device corresponding to the operating condition of the engine.

According to one embodiment of the invention, an in-cylinder pressure of the engine is detected. The second correlation coefficient is calculated based on the detected in-cylinder pressure in accordance with a predetermined equation. Thus, the second correlation coefficient is calculated in real time.

According to one embodiment of the invention, the desired component can be determined in accordance with a compression ratio of the engine. Further, the stroke volume and the first correlation coefficient can be determined in accordance with the compression ratio of the engine.

In an engine whose compression ratio is variable, a waveform of the volume change rate may change. By determining the desired component, the stroke volume and the first correlation coefficient in accordance with the compression ratio, the engine work can be more accurately calculated even for an engine whose compression ratio is variable.

According to one embodiment of the invention, a first component in a first condition of the engine and a first correlation coefficient corresponding to the first component are stored in a storage device. A second component in a second condition of the engine and a first correlation coefficient corresponding to the second component are also stored in the storage device. If a detected operating condition of the engine is between the first condition and the second condition, a first correlation coefficient corresponding to the detected operating condition of the engine is calculated by interpolating between the first correlation coefficient corresponding to the first component and the first correlation coefficient corresponding to the second component. Such interpolation can reduce the number of the desired components and the first correlation coefficients that are to be stored in the storage device. Such interpolation can be applied to the stroke volume.

According to one embodiment of the invention, a volume change rate corresponding to a detected operating condition of the engine is determined. The first correlation coefficient is calculated based on the volume change rate in accordance with a predetermined equation. Thus, the first correlation coefficient can be calculated in real time.

The engine work includes an indicated mean effective pressure.

According to another aspect of the present invention, an apparatus for implementing the above-described method is provided.

EXPLANATIONS OF LETTERS OR NUMERALS

| | |
|---|---|
| 1 | ECU |
| 2 | Engine |
| 15 | In-cylinder pressure sensor |
| 26 | Variable compression ratio mechanism |
| 27 | Compression ratio sensor |

BEST MODE FOR CARRYING OUT THE INVENTION

Figure 1:
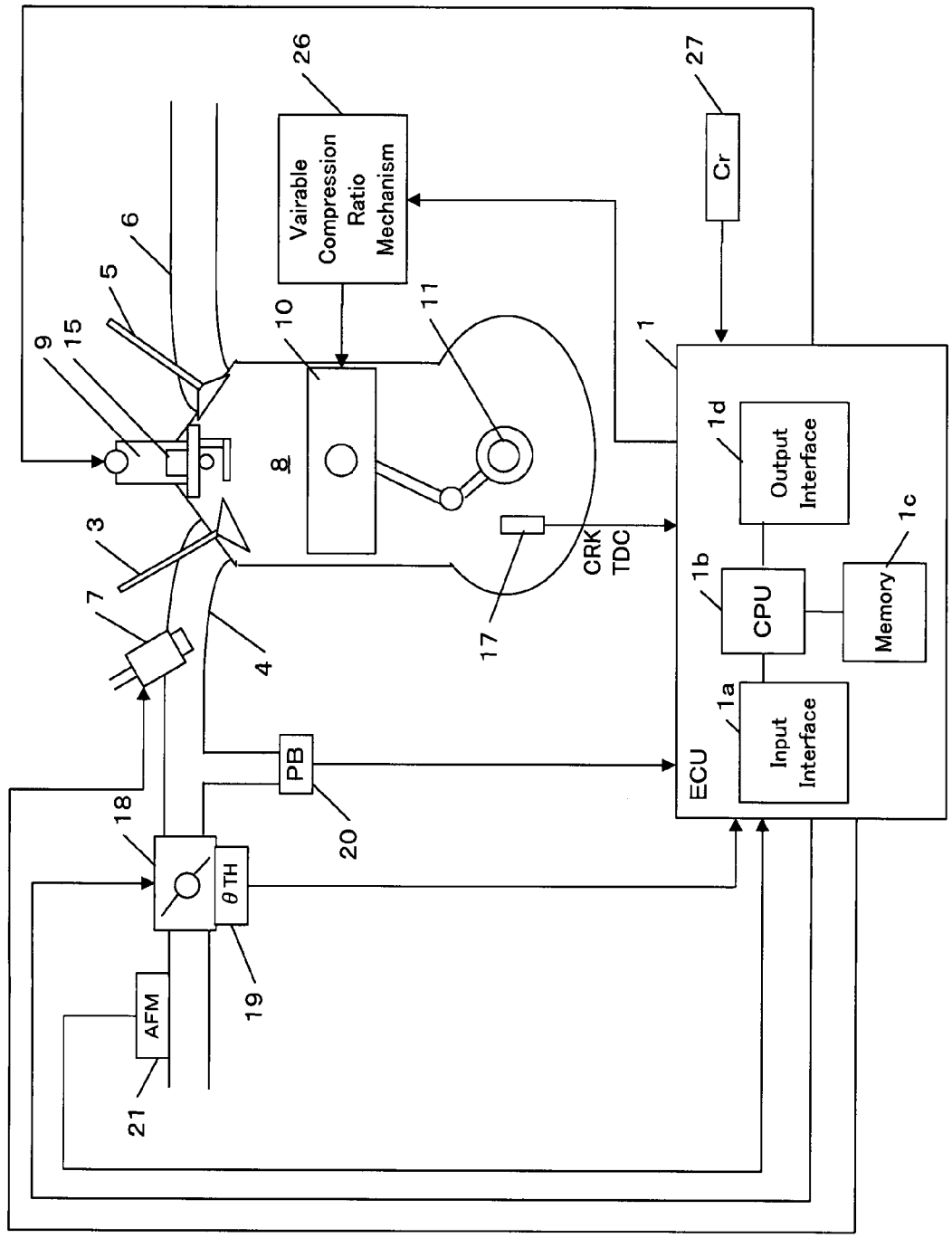
[FIG. 1] A diagram schematically showing an engine and its control unit in accordance with one embodiment of the present invention.

Preferred embodiments will be now described referring to the drawings. FIG. 1 shows an overall structure of an engine and its control unit in accordance with one embodiment of the present invention.

An electronic control unit (hereinafter referred to as an ECU) 1 is essentially a computer having a central processing unit (CPU) 1b. The ECU1 comprises a memory 1c that includes a read only memory (ROM) for storing programs for controlling each part of the vehicle and maps required for executing the programs and a random access memory (RAM) for providing work areas for operations by the CPU 1b and temporarily storing programs and data. The ECU 1 further comprises an input interface 1a for receiving data sent from each part of the vehicle and an output interface 1d for sending a control signal to each part of the vehicle.

An engine 2 is a 4-cycle engine in this embodiment. The engine 2 is connected to an air intake manifold 4 through an air intake valve 3 and connected to an exhaust manifold 6 through an exhaust valve 5. A fuel injection valve 7 for injecting fuel in accordance with a control signal from the ECU 1 is disposed in the intake manifold 4.

The engine 2 takes air-fuel mixture from air taken from the intake manifold 4 and fuel injected by the fuel injection valve 7 into the combustion chamber 8. A spark plug 9 is provided in the combustion chamber 8 to ignite a spark in accordance with an ignition timing signal from the ECU 1. The air-fuel mixture is combusted by the spark ignited by the spark plug 9. The combustion increases the volume of the mixture, which pushes the piston 10 downward. The reciprocating motion of the piston 10 is converted into the rotation motion of the crankshaft 11.

An in-cylinder pressure sensor 15 is, for example, a piezoelectric element sensor. The in-cylinder pressure sensor 15 is embedded in a portion of the spark plug 9 that contacts the cylinder. The in-cylinder pressure sensor 15 generates a signal corresponding to a rate of change in a pressure within the combustion chamber 8 (in-cylinder pressure) and sends it to the ECU 1. The ECU 1 integrates the signal indicating the rate of change in the in-cylinder pressure to generate a signal P indicating the in-cylinder pressure.

A crank angle sensor 17 is disposed in the engine 2. The crank angle sensor 17 outputs a CRK signal and a TDC signal, which are pulse signals, to the ECU 1 in accordance with the rotation of a crankshaft 11.

The CRK signal is a pulse signal that is output at every predetermined crank angle (for example, 30 degrees). The ECU 1 calculates a rotational speed NE of the engine 2 in accordance with the CRK signal. The TDC signal is also a pulse signal that is output at a crank angle associated with the TDC position of the piston 10.

A throttle valve 18 is disposed in an intake manifold 4 of the engine 2. An opening degree of the throttle valve 18 is controlled by a control signal from the ECU 1. A throttle valve opening sensor (θTH) 19, which is connected to the throttle valve 18, provides the ECU 1 with a signal indicating the opening degree of the throttle valve 18.

An intake manifold pressure (Pb) sensor 20 is disposed downstream of the throttle valve 18. The intake manifold pressure Pb detected by the Pb sensor 20 is sent to the ECU 1.

An airflow meter (AFM) 21 is disposed upstream of the throttle valve 18. The airflow meter 21 detects the amount of air passing through the throttle valve 18 and sends it to the ECU 1.

A variable compression ratio mechanism 26 is a mechanism that is capable of changing a compression ratio within the combustion chamber in accordance with a control signal from the ECU 1. The variable compression ratio mechanism 26 can be implemented by any known technique. For example, a technique has been proposed for changing a compression ratio according to the operating condition of the engine by changing the position of the piston using a hydraulic pressure.

A compression ratio sensor 27 is connected to the ECU 1. The compression ratio sensor 27 detects a compression ratio Cr of the combustion chamber and sends it to the ECU 1.

A signal sent to the ECU 1 is passed to the input interface 1a and is analogue-digital converted. The CPU 1b processes the resulting digital signal in accordance with a program stored in the memory 1c, and creates a control signal. The output interface 1d sends the control signal to actuators for the fuel injection valve 7, spark plug 9, throttle valve 18, and other mechanical components. The CPU 1b can calculate work performed by the engine using digital signals thus converted in accordance with one or more programs stored in the memory 1c.

The indicated mean effective pressure is often used as an index representing work performed by an engine. The mean effective pressure is a value obtained by dividing engine work achieved during one combustion cycle by a stroke volume. The indicated mean effective pressure is a value obtained by subtracting from the mean effective pressure, for example, cooling loss, incomplete combustion, and mechanical friction. These indexes may be used to evaluate performance gaps among engines having different total stroke volumes (different engine displacements).

Figure 2:
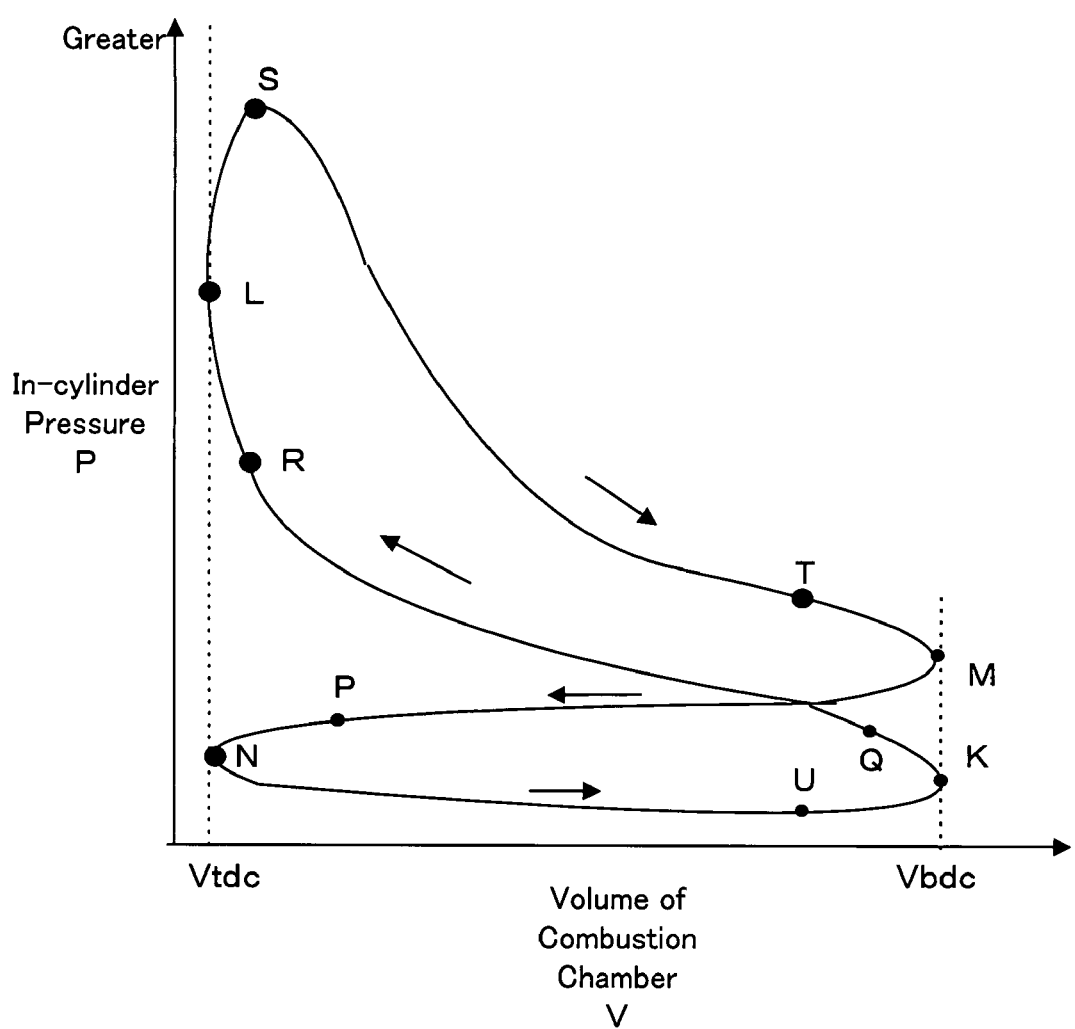
[FIG. 2] A diagram showing an indicated mean effective pressure in accordance with one embodiment of the present invention.

FIG. 2 shows a so-called PV chart that indicates a relationship between a volume V and an in-cylinder pressure P of the combustion chamber over one combustion cycle. At P point, the intake valve opens and the intake stroke starts. The in-cylinder pressure continues to decrease until the piston reaches U point, which indicates the minimum value, through N point that is the top dead center (TDC). Thereafter, the piston passes through K point that is the bottom dead center (BDC) and the in-cylinder pressure increases. At Q point, the compression stroke starts and the in-cylinder pressure continues to increase. At R point, the combustion stroke starts. The in-cylinder pressure rapidly increases due to the combustion of the air-fuel mixture. At S point, the in-cylinder pressure reaches the maximum value. The piston is pushed down by the combustion of the air-fuel mixture and moves toward a BDC indicated by M point. This movement reduces the in-cylinder pressure. At T point, the exhaust valve opens and the exhaust stroke starts. During the exhaust stroke, the in-cylinder pressure further decreases.

The indicated mean effective pressure is calculated by dividing the area surrounded by the curve illustrated in FIG. 2 by the stroke volume of the piston.

In the following embodiments, a technique for calculating the indicated mean effective pressure will be described. It should be noted that the term "engine work" includes other indexes such as mean effective pressure, brake mean effective pressure, engine torque or the like which can be derived based on the indicated mean effective pressure determined by a technique according to the present invention.

The indicated mean effective pressure Pmi can be calculated by contour-integrating the PV curve as shown in FIG. 2. This calculation can be expressed as in the equation (1). An integral interval corresponds to one combustion cycle. It should be noted that the starting point of the integral interval can be set at an arbitrary time point.

The equation (2) is a discrete representation of the equation (1). Here, m in the equation (2) indicates a calculation cycle. Vs indicates a stroke volume of one cylinder. dV indicates a volume change rate of the cylinder. P indicates an in-cylinder pressure signal that can be determined based on the output of the in-cylinder pressure sensor 15 (FIG. 1) as described above.

$$Pmi = \frac{1}{Vs}\oint PdV \quad (1)$$

$$= \frac{1}{Vs}\sum_{m=0}^{n-1}\left(\frac{P_{m+1}+P_m}{2}\right)(V_{m+1}-V_m) \quad (2)$$

As shown by the equation (1), the indicated mean effective pressure Pmi is represented as a correlation coefficient between the in-cylinder pressure signal P and the volume change rate dV. Frequency components substantially constituting the volume change rate dV are limited (details will be described later). Thus, the indicated mean effective pressure Pmi can be determined by calculating the correlation coefficient between P and dV for only the frequency components constituting the volume change rate.

In order to frequency-resolve the volume change rate dV, the volume change rate dV is expanded in a Fourier-series, as shown by the equation (3). Here, t indicates time. T indicates the length of a rotation cycle of the crankshaft of the engine (referred to as a crank cycle hereinafter) and $\omega$ indicates the angular frequency. As to a 4-cycle engine, one cycle T corresponds to 360 degrees. k indicates the order of the engine rotation frequency.

$$dV(\omega t) = f(t) = \frac{V_{a0}}{2} + \sum_{k=1}^{\infty}(V_{ak}\cos k\omega t + V_{bk}\sin k\omega t) \quad (3)$$

$$V_{a0} = \frac{2}{T}\int_0^T f(t)dt$$

$$V_{ak} = \frac{2}{T}\int_0^T f(t)\cos k\omega t\, dt$$

$$V_{bk} = \frac{2}{T}\int_0^T f(t)\sin k\omega t\, dt$$

The equation (4) is derived by applying the equation (3) to the equation (1). Here, $\theta=\omega t$.

$$Pmi = \frac{1}{Vs}\oint Pdv \quad (4)$$

$$= \frac{1}{Vs}\oint P \times \left(\frac{V_{a0}}{2} + \sum_{k=1}^{\infty}(V_{ak}\cos k\theta + V_{bk}\sin k\theta)\right)d\theta$$

$$= \frac{1}{Vs}\oint P \times \{\frac{V_{a0}}{2} + V_{a1}\cos\theta + V_{a2}\cos 2\theta + V_{a3}\cos 3\theta + V_{a4}\cos 4\theta + \ldots + V_{b1}\sin\theta + V_{b2}\sin 2\theta + V_3\sin 3\theta + + V_{b4}\sin 4\theta + \ldots\}d\theta$$

$$= \frac{1}{Vs}\oint P\frac{V_{a0}}{2}d\theta + \frac{V_{a1}}{Vs}\oint P\cos\theta d\theta + \frac{V_{a2}}{Vs}\oint P\cos 2\theta d\theta + \ldots + \frac{V_{b1}}{Vs}\oint P\sin\theta d\theta + \frac{V_{b2}}{Vs}\oint P\sin 2\theta d\theta + \ldots$$

On the other hand, the in-cylinder pressure signal P is expanded into a Fourier series. The Fourier coefficients Pak and Pbk for the in-cylinder pressure signal can be expressed as shown by the equation (5). One cycle Tc of the in-cylinder pressure signal has a length equivalent to the length of one combustion cycle. As to a 4-cycle engine, the cycle Tc is twice the crank cycle T because one combustion cycle corresponds to 720 degrees crank angle. Therefore, $\theta c$ in the equation (5) is $\theta/2$ in the 4-cycle engine. kc indicates the order of the in-cylinder pressure signal's frequency.

$$Pak = \frac{2}{Tc}\oint P\cos kc\theta c\, d\theta = \frac{2}{2T}\oint P\cos kc\frac{\theta}{2}d\theta \quad (5)$$

$$Pbk = \frac{2}{Tc}\oint P\sin kc\theta c\, d\theta = \frac{2}{2T}\oint P\sin kc\frac{\theta}{2}d\theta$$

There are components of $\cos\theta$, $\cos 2\theta$, $\sin\theta$, $\sin 2\theta$, ... in the equation (4). By assuming kc=2k in the equation (5), the Fourier coefficients Pak and Pbk for these components can be determined. That is, in order to calculate the indicated mean effective pressure Pmi for the 4-cycle engine, only the second, fourth, sixth, ... order (kc=2, 4, 6, ...) frequency components are required for the Fourier coefficients Pak and Pbk of the in-cylinder pressure signal, among the first, second, third, ... order (k=1, 2, 3, ...) frequency components for the Fourier coefficients Vak and Vbk of the volume change rate. Assuming kc=2k, the equation (5) can be expressed by the equation (6).

$$Pak = \frac{2}{2T}\oint P\cos kc\frac{\theta}{2}d\theta = \frac{2}{2T}\oint P\cos k\theta\, d\theta \quad (6)$$

$$Pbk = \frac{2}{2T}\oint P\sin kc\frac{\theta}{2}d\theta = \frac{2}{2T}\oint P\sin k\theta\, d\theta$$

By applying the equation (6) to the equation (4), the equation (7) is derived. Here, "Va0" in the equation (4) is almost zero (This reason will be described later).

$$Pmi = \frac{2T}{2Vs}\left(\sum_{k=1}^{\infty}P_{ak}V_{ak} + \sum_{k=1}^{\infty}P_{bk}V_{bk}\right) \quad (7)$$

The equation (7) includes the stroke volume Vs and the Fourier coefficients Vak and Vbk for the volume change rate dV. Therefore, even for an engine in which the stroke volume Vs and the waveform of the volume change rate dV with respect to the crank angle are variable, the indicated mean effective pressure Pmi can be more accurately calculated.

The equation (7) is for a 4-cycle engine. It would be obvious to those skilled in the art that the indicated mean effective pressure for a 2-cycle engine can be calculated in a similar way to the 4-cycle engine as described above. In the case of a 2-cycle engine, Tc=T and $\theta c=\theta$.

The equation (6) for calculating the Fourier coefficients Pak and Pbk of the in-cylinder pressure is expressed in the continuous time system. The equation (6) is transformed into the discrete time system appropriate for digital processing, which is shown by the equation (8). Here, N indicates the number of times of sampling in each crank cycle T. The integral interval has a length equivalent to one combustion cycle. The number of times of sampling in each combustion cycle is 2N. n indicates a sampling number. Pn indicates an in-cylinder pressure in the n-th sampling.

$$Pak = \frac{2}{2T}\oint P\cos k\theta d\theta \quad (8)$$

$$= \frac{2}{2T}\oint P\cos k\omega t dt$$

$$= \frac{2}{2T}\oint P\cos k\frac{2\pi}{T}t dt$$

$$= \frac{2}{2N}\sum_{n=1}^{2N} P_n\cos k\frac{2\pi}{N}n$$

$$Pbk = \frac{2}{2T}\oint P\sin k\theta d\theta$$

$$= \frac{2}{T}\oint P\sin k\omega t dt$$

$$= \frac{2}{2T}\oint P\sin k\frac{2\pi}{T}t dt$$

$$= \frac{2}{2N}\sum_{n=1}^{2N} P_n\sin k\frac{2\pi}{N}n$$

By combining the equations (7) and (8), the equation (9) is obtained.

$$Pmi = \frac{2N}{2Vs}\left(\sum_{k=1}^{\infty} P_{ak}V_{ak} + \sum_{k=1}^{\infty} P_{bk}V_{bk}\right) \quad (9)$$

$$Pak = \frac{2}{2N}\sum_{n=1}^{2N} P_n\cos k\frac{2\pi}{N}n$$

$$Pbk = \frac{2}{2N}\sum_{n=1}^{2N} P_n\sin k\frac{2\pi}{N}n$$

In this embodiment, as shown by the equation (9), the Fourier coefficients Pak and Pbk of the in-cylinder pressure are calculated in real time in response to the detected in-cylinder pressure sample Pn. The stroke volume Vs and the Fourier coefficients Vak and Vbk of the volume change rate are pre-calculated and stored in the memory 1c of the ECU 1 (FIG. 1).

The stroke volume Vs and the waveform of the volume change rate dV corresponding to the operating condition of the engine depend on the engine characteristics. Therefore, the stroke volume Vs and the volume change rate dV corresponding to the operating condition of the engine can be determined in advance through simulations or the like. In this embodiment, the stroke volume Vs and the Fourier coefficients Vak and Vbk corresponding to the operating condition of the engine are pre-stored in the memory 1c.

Alternatively, the Fourier coefficients Vak and Vbk may be calculated in real time in response to detecting the volume change rate. The equation (10) is for this calculation. Here, the integral interval is one crank cycle T. Vn indicates a volume change rate acquired in the n-th sampling, into which the detected volume change rate is substituted.

$$Vak = \frac{2}{T}\oint V_n\cos k\frac{2\pi}{T}t dt = \frac{2}{N}\sum_{n=1}^{N} V_n\cos k\frac{2\pi}{N}n \quad (10)$$

$$Vbk = \frac{2}{T}\oint V_n\sin k\frac{2\pi}{T}t dt = \frac{2}{N}\sum_{n=1}^{N} V_n\sin k\frac{2\pi}{N}n$$

The integral interval may have a length of 2 crank cycles that is equivalent to one combustion cycle. In this case, the equation (11) is used to calculate the Fourier coefficients of the volume change rate. The calculation result is the same as the equation (10).

$$Vak = \frac{2}{2T}\oint V_n\cos k\frac{2\pi}{T}t dt = \frac{2}{2N}\sum_{n=1}^{2N} V_n\cos k\frac{2\pi}{N}n \quad (11)$$

$$Vbk = \frac{2}{2T}\oint V_n\sin k\frac{2\pi}{T}t dt = \frac{2}{2N}\sum_{n=1}^{2N} V_a\sin k\frac{2\pi}{N}n$$

Now, the Fourier coefficient is considered in detail. As seen from the equation (8), each of the Fourier coefficients of the in-cylinder pressure can be considered as a correlation coefficient between the in-cylinder pressure signal P and a signal that consists of one of the frequency components obtained by frequency-resolving the volume change dV. Similarly, as seen from the equation (10), each of the Fourier coefficients of the volume change rate can be considered as a correlation coefficient between the volume change rate signal dV and a signal that consists of one of the frequency components obtained by frequency-resolving the volume change rate dV. For example, the Fourier coefficient Pa1 is a correlation coefficient between the in-cylinder pressure signal P and cos θ. The volume change rate Vb2 is a correlation coefficient between the volume change rate signal dV and sin 2θ.

Thus, each of the Fourier coefficients of the in-cylinder pressure indicates an in-cylinder pressure signal extracted at the corresponding frequency component. Each of the Fourier coefficients of the volume change rate indicates a volume change rate signal extracted at the corresponding frequency component. As described above, because the frequency component(s) substantially constituting the volume change rate dV are limited, the indicated mean effective pressure Pmi can be calculated by using the in-cylinder pressure signal and the volume change rate signal that are extracted only at such limited frequency component(s). The present invention provides such calculation technique.

In this embodiment, the Fourier series expansion is used to extract the in-cylinder pressure signal and the volume change rate signal at frequency components substantially constituting the volume change rate. However, this extraction may be implemented by using another technique.

Now, the equation (9) for calculating the indicated mean effective pressure Pmi will be discussed referring to various embodiments.

Figure 3:
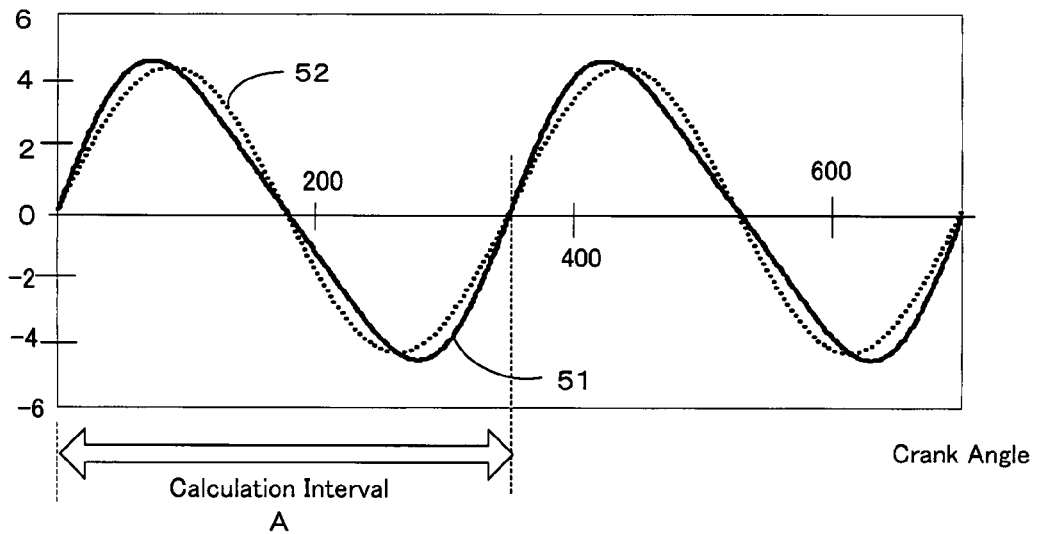
[FIG. 3] A diagram showing a volume change rate in accordance with one embodiment of the present invention.

FIG. 3 shows a waveform 51 of the volume change rate dV and a waveform 52 of a sine function having the same cycle as the volume change rate dV for a general engine in which the waveform of the volume change rate dV with respect to the crank angle is constant (in other words, the stroke volume is constant and hence there is no variation in the behavior of the volume change rate dV). The amplitude depends on the magnitude of the stroke volume. In this example, the calculation interval A for the Fourier coefficient is one combustion cycle starting from the TDC (top dead center) of the intake stroke. The sine function is established to have zero at the start of the calculation interval A.

As seen from the figure, both waveforms are very similar to each other, which indicates that the volume change rate dV can be expressed by a sine function. The volume change rate dV has almost no offset or phase difference with respect to the sine function. Therefore, it is predicted that almost no direct current (DC) component and almost no cosine components appear in the frequency components of the volume change rate.

Figure 4:
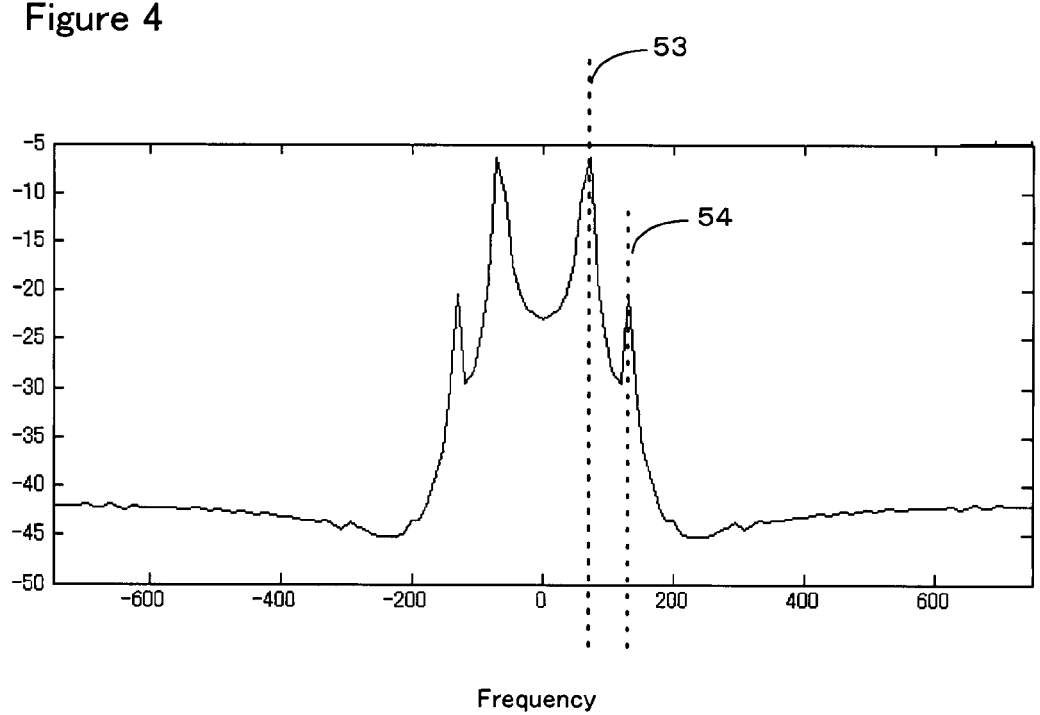
[FIG. 4] A diagram showing a result of an FFT analysis on a volume change rate in accordance with one embodiment of the present invention.

FIG. 4 shows a result of an FFT analysis on the volume change rate dV of such an engine. Reference numeral 53 is a line indicating the first order frequency of the engine rotation and reference numeral 54 is a line indicating the second order frequency of the engine rotation. As seen from the analysis result, the volume change rate dV mainly has only the first and second order frequency components of the engine rotation.

Figure 5:
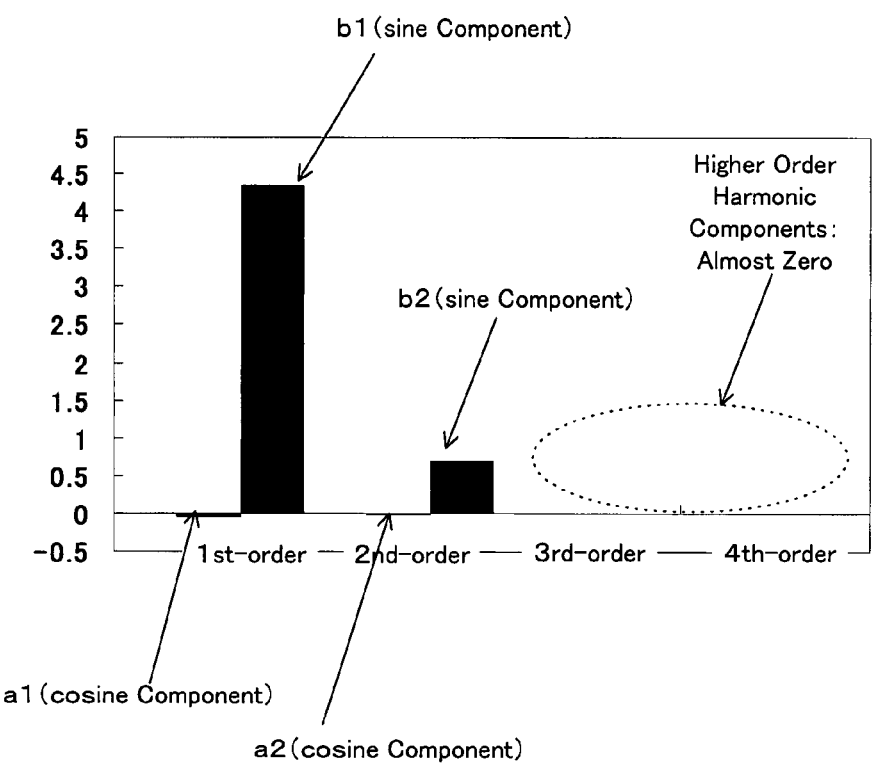
[FIG. 5] A diagram showing a value of each order Fourier coefficient in accordance with one embodiment of the present invention.

FIG. 5(a) shows an example of the Fourier coefficients of the volume change rate dV that were actually calculated for the calculation interval A shown in FIG. 3. FIG. 5(b) graphically shows the magnitude of each Fourier coefficient in FIG. 5(a). It is seen that the direct current component Va0 and the cosine components Vak (k=1, 2, ... ) whose phase is shifted from the sine components are almost zero. It is also seen that the third and higher order harmonic frequency components (k≧3) are almost zero.

Thus, in an engine in which the waveform of the volume change rate does not change, the volume change rate dV mainly consists of sine components at the first and second order frequency components of the engine rotation. In other words, among the Fourier coefficients of the volume change rate dV, components other than the first and second order sine components can be ignored. Considering this, the equation (9) can be expressed as shown by the equation (12).

$$Pmi = \frac{2N}{2Vs}(P_{b1}V_{b1} + P_{b2}V_{b2}) \qquad (12)$$

$$Pbk = \frac{2}{2N}\sum_{n=1}^{2N} P_n \sin k\frac{2\pi}{N}n$$

In this example, because the stroke volume Vs in the equation (12) has a constant value, (2N/2Vs) can be handled as a predetermined value.

Thus, for an engine in which the waveform of the volume change rate does not change, because the frequency components substantially constituting the volume change are the first and second sine components, only the Fourier coefficients Vb1 and Vb2 of the volume change rate dV and the Fourier coefficients Pb1 and Pb2 of the in-cylinder pressure P are required for calculating the indicated mean effective pressure Pmi.

Some variable compression ratio mechanisms change the stroke volume depending on the operating condition of an engine and hence change the waveform of the volume change rate dV with respect to the crank angle. The following embodiments where the variable compression ratio mechanism 26 shown in FIG. 1 has such characteristics will be described.

FIG. 6(a) shows a waveform 61 (solid line) of the volume change rate dV under a certain operating condition as an example. A waveform 62 of a sine function having the same cycle as the waveform 61 of the volume change rate dV is also shown. A calculation interval A is set similarly to FIG. 5 and the sine function is established to have a value of zero at the start of the calculation interval A.

The waveform 61 of the volume change rate dV is distorted as compared with the waveform 62 of the sine function. Therefore, it is predicted that the volume change rate dV includes not only sine components but also cosine components. FIG. 6(b) shows values of the Fourier coefficients for the components of the volume change rate dV shown in FIG. 6(a), which were actually calculated for the calculation interval A. It is seen that the volume change rate dV can be expressed by the first and second order sine components and the first and second order cosine components. Therefore, the indicated mean effective pressure Pmi can be expressed as shown by the equation (13).

$$Pmi = \frac{2N}{2Vs}(P_{a1}V_{a1} + P_{a2}V_{a2} + P_{b1}V_{b1} + P_{b2}V_{b2}) \qquad (13)$$

$$Pak = \frac{2}{2N}\sum_{n=1}^{2N} P_n \cos k\frac{2\pi}{N}n$$

$$Pbk = \frac{2}{2N}\sum_{n=1}^{2N} P_n \sin k\frac{2\pi}{N}n$$

A value corresponding to the detected operating condition of the engine is substituted into the stroke volume Vs in the equation (13).

Thus, because the frequency components substantially constituting the volume change rate under this operating condition are the first and second order sine components and the first and second order cosine components, only the Fourier coefficients Va1, Va2, Vb1 and Vb2 of the volume change rate dV and the Fourier coefficients Pa1, Pa2, Pb1 and Pb2 of the in-cylinder pressure P are required for calculating the indicated mean effective pressure Pmi.

FIG. 7(a) shows a waveform 71 (solid line) of the volume change rate dV under another operating condition of the engine. A waveform 72 of a sine function having the same cycle as the waveform 71 of the volume change rate dV is also shown. A calculation interval A is set similarly to FIG. 5 and the sine function is established to have a value of zero at the start of the calculation interval A. It is seen that the waveform 71 of the volume change rate dV is almost the same as the waveform 72 of the sine function. FIG. 7(b) shows values of the Fourier coefficients for the components of the volume change rate dV shown in FIG. 7(a), which were actually calculated for the calculation interval A. As seen from the figure, the volume change rate dV can be expressed only by the first order sine component.

Thus, because the frequency component substantially constituting the volume change rate under this operating condition is the first order sine component, the indicated mean effective pressure Pmi can be expressed as shown by the equation (14). A value corresponding to the detected operating condition of the engine is substituted into the stroke volume Vs in the equation (14).

$$Pmi = \frac{2N}{2Vs}(P_{b1}V_{b1}) \qquad (14)$$

$$Pbk = \frac{2}{2N}\sum_{n=1}^{2N} P_n \sin k\frac{2\pi}{N}n$$

Figure 7:
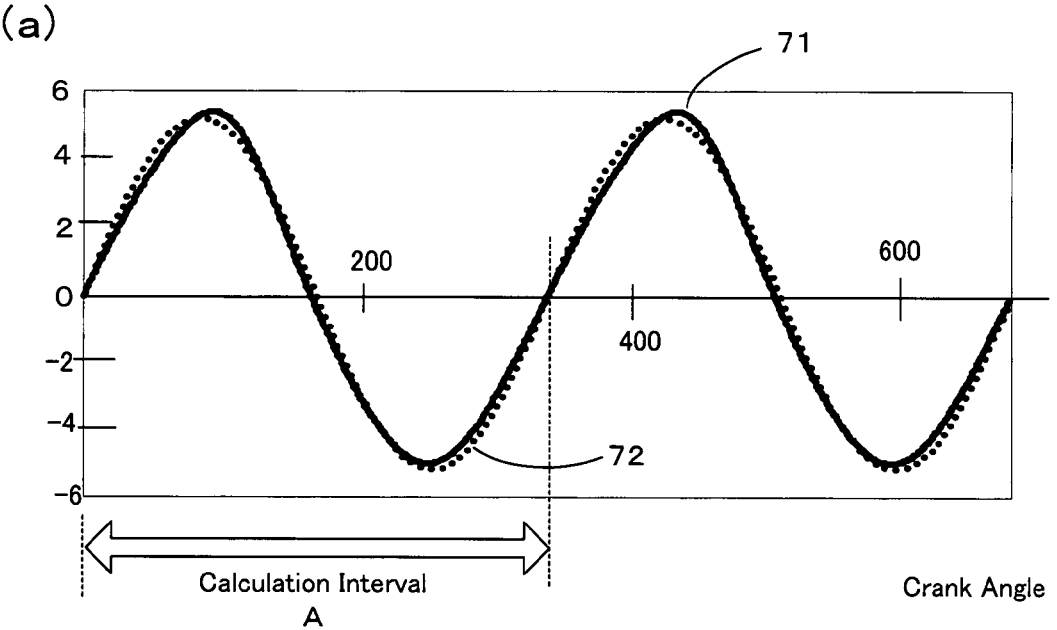
[FIG. 7] A diagram showing a volume change rate and values of Fourier coefficients thereof in accordance with one embodiment of the present invention.
Figure 7:
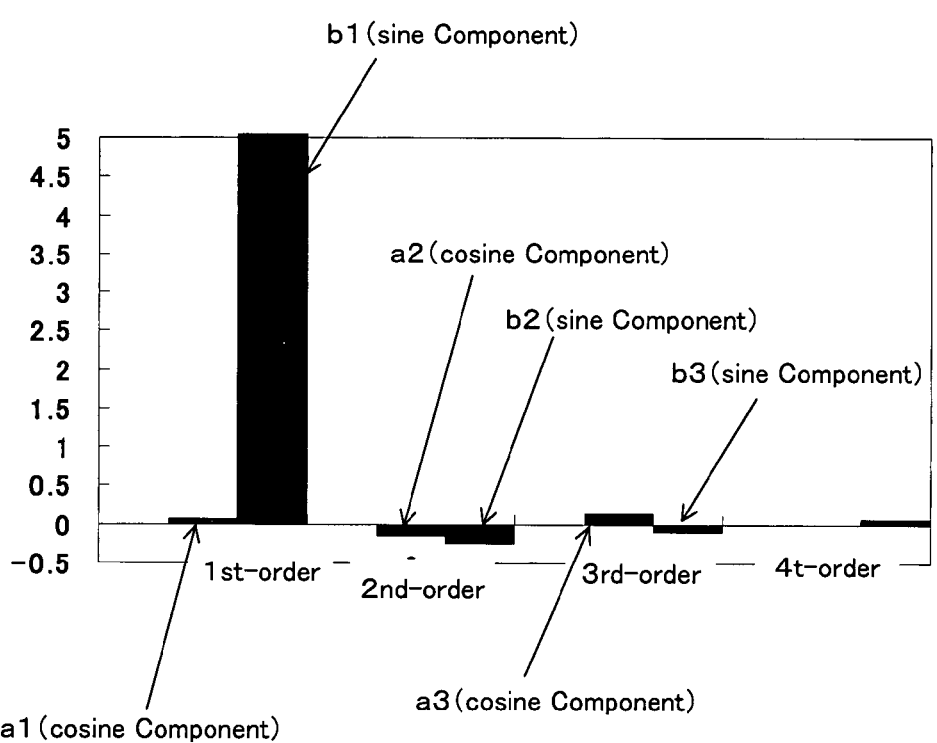

Considering vibration and friction of the piston movement, it may be preferable to bring the waveform of the volume change rate dV close to the waveform of the sine function, as much as possible. For this reason, an engine may be structured such that the waveform of the volume change rate dV is similar to the waveform of the sine function. As shown in FIG. 7, when the waveform of the volume change rate dV is similar to the sine waveform, the number of Fourier coefficients required for calculating the indicated mean effective pressure can be reduced.

Figure 6:
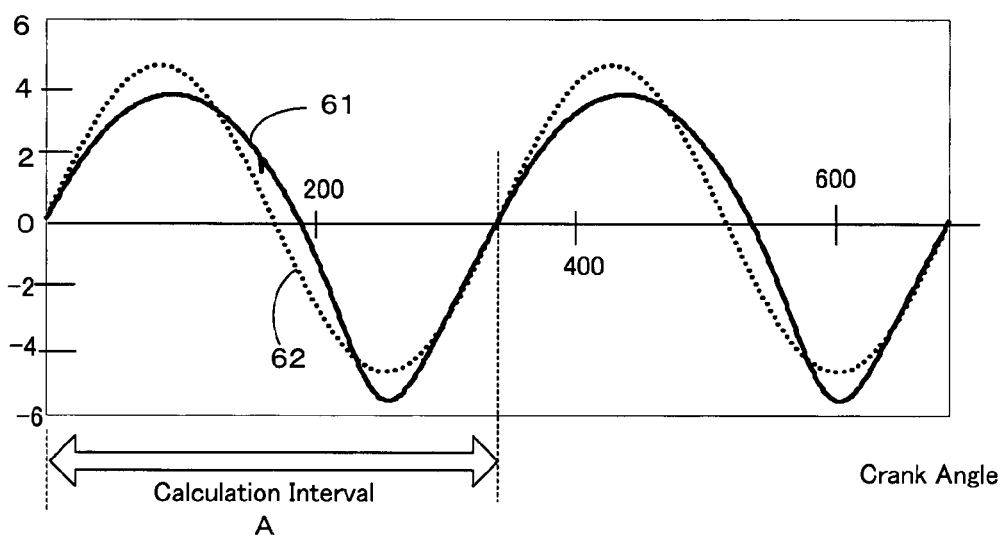
[FIG. 6] A diagram showing a volume change rate and values of Fourier coefficients thereof in accordance with one embodiment of the present invention.
Figure 6:
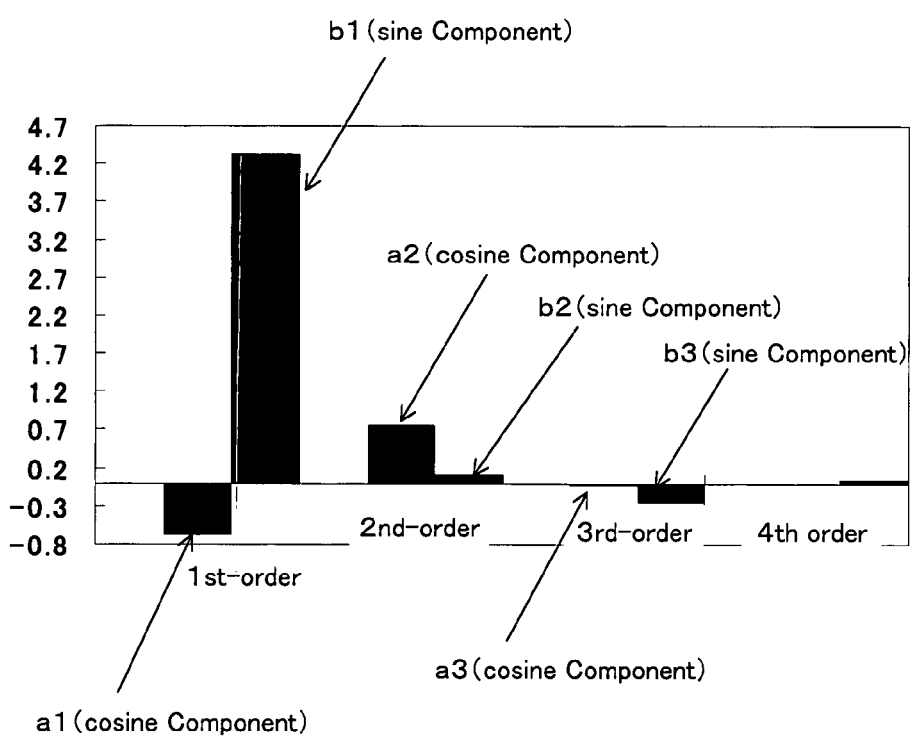

Thus, according to the present invention, the Fourier coefficients of the volume change rate and the in-cylinder pressure do not need to be calculated for all of the components (namely, for all order sine/cosine components). It is sufficient to calculate the Fourier coefficients only for desired components, that is, preferably only for components required for calculating the indicated mean effective pressure with a desired accuracy. In the example of FIG. 3, only the Fourier coefficients Vb1 and Vb2 for the first and second order sine components of the volume change rate dV and the Fourier coefficients Pb1 and Pb2 for the first and second order sine components of the in-cylinder pressure P need to be determined. In the example of FIG. 6, only the Fourier coefficients Vb1, Vb2, Va1 and Va2 for the first and second order sine and cosine components of the volume change rate dV and the Fourier coefficients Pb1, Pb2, Pa1 and Pa2 for the first and second order sine and cosine components of the in-cylinder pressure P need to be determined. Thus, by determining only the desired components, the number of the Fourier coefficients to be calculated can be reduced, thereby reducing the calculation load for the indicated mean effective pressure.

A sample Pn of the in-cylinder pressure as shown in the equation (9) is used to calculate the Fourier coefficients Pak and Pbk in real time. The sample Pn of the in-cylinder pressure is obtained by sampling, in a predetermined cycle, the in-cylinder pressure derived from the output of the in-cylinder pressure sensor. According to a technique of the present invention, if components required for calculating the indicated mean effective pressure are determined, the sampling frequency of the in-cylinder pressure P can be reduced (down-sampled or decimated) to a frequency that satisfies the sampling theorem. For example, according to the equations (12) and (13), the sampling frequency required for acquiring a sample Pn of the in-cylinder pressure does not need to be higher than a frequency level required for extracting the first and second order frequency components of the engine rotation. A higher sampling frequency for extracting the third and higher harmonic frequency components of the engine rotation is not required. Therefore, the sampling frequency can be reduced. Furthermore, even when aliasing may appear in frequency components other than the desired components, there is no influence on the calculation of the indicated mean effective pressure. Therefore, limitations on an anti-aliasing filter, which may be usually applied to the in-cylinder pressure signal, can be reduced.

When the Fourier coefficients of the volume change rate are determined in real time in accordance with the equation (10) or (11), the sampling frequency of the volume change rate can be also reduced similarly to the in-cylinder pressure.

Components desired for calculating the indicated mean effective pressure can be pre-determined through a simulation or the like. In one embodiment of the present invention, the Fourier coefficients Vak and Vbk for the desired components and the stroke volume Vs corresponding to the operating condition of the engine are pre-stored in the memory $1c$ (FIG. 1). For example, in an engine in which the waveform of the volume change rate dV does not change, the stroke volume Vs and the Fourier coefficients Vb1 and Vb2 have constant values as described above referring to FIG. 3. These constant values are stored in the memory. In an engine in which the waveform of the volume change rate dV changes (as described above referring to FIGS. 6 and 7), the stroke volume Vs and the Fourier coefficients Vb1, Vb2, Va1 and Va2 that correspond to one operating condition of the engine are pre-stored in the memory (in the case of FIG. 6). The stroke volume Vs and the Fourier coefficient Vb1 that correspond to another operating condition of the engine are pre-stored in the memory (in the case of FIG. 7). In order to calculate the indicated mean effective pressure, the memory $1c$ is referred to extract the Fourier coefficients of the volume change rate for the desired components and the stroke volume. Thus, because the indicated mean effective pressure is calculated by using the values pre-calculated for the Fourier coefficients of the volume change rate and the stroke volume, the calculation load for the indicated mean effective pressure can be reduced.

Figure 8:
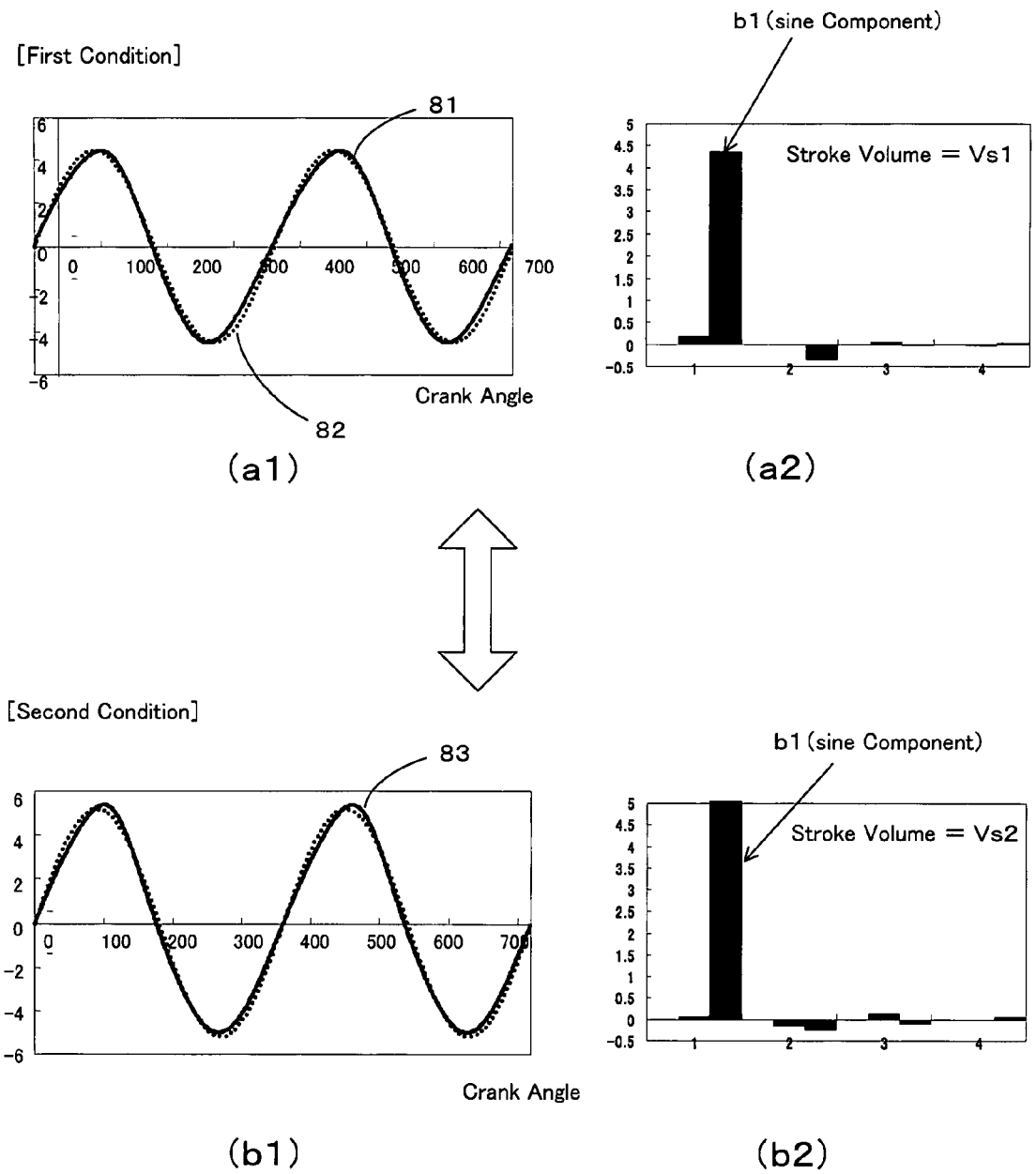
[FIG. 8] A diagram showing a volume change rate and values of Fourier coefficients thereof in accordance with one embodiment of the present invention.

FIG. 8 shows yet another embodiment, in which the values of the Fourier coefficients of the volume change rate change although the types of components desired for calculating the indicated mean effective pressure do not change. In FIG. 8, a first operating condition (a1)/(a2) and a second operating condition (b1)/(b2) of an engine are shown. (a1) and (b1) show waveforms (solid lines) 81, 83 of the volume change rate dV and a waveform (dotted line) 82 of the sine function having the same cycle as the volume change rate dV. (a2) and (b2) show the value of the Fourier coefficient for each component. Between the first and second conditions, the types of the desired components for calculating the indicated mean effective pressure do not change (the first order sine component in the both conditions), but the value of the Fourier coefficient of the first order sine component changes. Between the first and second conditions, the stroke volume Vs also changes.

Such changes are caused by the variable compression ratio mechanism. In the first condition, the stroke volume is Vs1 and the value of the Fourier coefficient Vb1 is about 4.3. In the second condition, the stroke volume is Vs2 and the value of the Fourier coefficient Vb1 is about 5.1.

For each of the first and second conditions, the values of the stroke volume and the Fourier coefficient can be pre-stored in the memory $1c$ (FIG. 1). Depending on whether the detected engine condition is the first or the second condition, the corresponding stroke volume and the Fourier coefficient are extracted from the memory $1c$ to calculate the indicated mean effective pressure in accordance with the equation (9).

When the detected engine condition is between the first and second conditions, values of the stroke volume Vs and the Fourier coefficient Vb1 that correspond to the detected engine condition can be calculated by, for example, interpolating between the values of the stroke volume Vs and the Fourier coefficient Vb1 shown in (a2) and the values of the stroke volume Vs and the Fourier coefficient Vb1 shown in (b2). Such interpolation can reduce the number of the stroke volumes and the Fourier coefficients to be stored in the memory.

Figure 9:
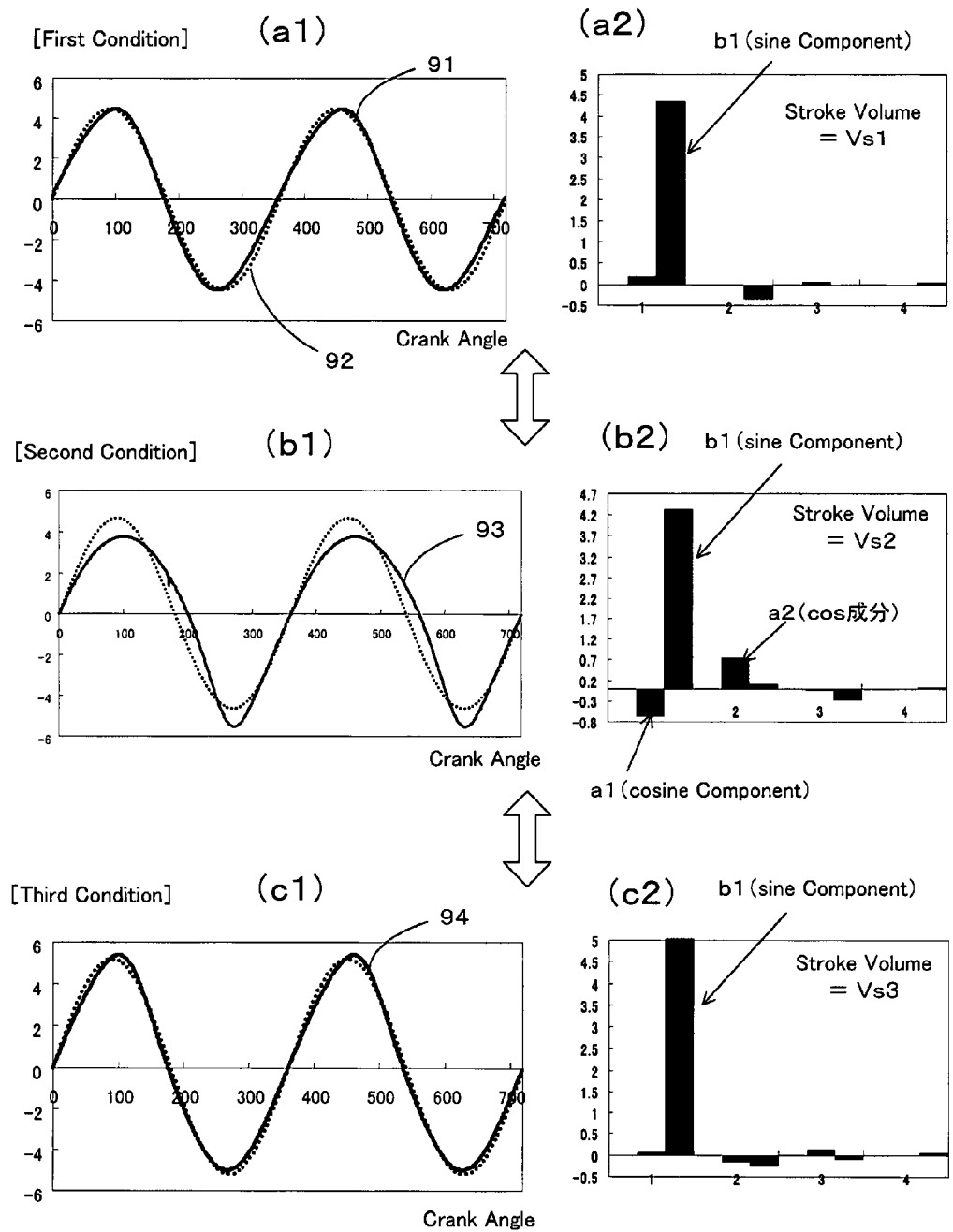
[FIG. 9] A diagram showing a volume change rate and values of Fourier coefficients thereof in accordance with one embodiment of the present invention.

FIG. 9 shows yet another embodiment in which the types of components desired for calculating the indicated mean effective pressure change. In the figure, a first operating condition (a1)/(a2), a second operating condition (b1)/(b2) and a third operating condition (c1)/(c2) of an engine are shown. As seen from (a1), (b1) and (c1), the waveform (solid line) of the volume change rate dV changes as indicated by reference numerals 91, 93 and 94. A waveform 92 representing a sine function having the same cycle as the waveform of the volume change rate dV is also shown. (a2), (b2) and (c2) show the value of the Fourier coefficient for each component.

Among the first, second and third conditions, the stroke volume and the types of the desired components required for calculating the indicated mean effective pressure change. In the first condition, the stroke volume is Vs1 and the desired component is the first order sine component Vb1, the value of which is about 4.3. In the second condition, the stroke volume is Vs2 and the desired components are the first order sine component Vb1, the first order cosine component Va1 and the second order cosine component Va2. Those values are about 4.3, −0.7 and 0.8, respectively. In the third condition, the stroke volume is Vs3 and the desired component is the first order sine component Vb1, the value of which is about 5.1.

Similarly to the example of FIG. 8, for each operating condition, the values of the stroke volume and the Fourier coefficient(s) can be pre-stored in the memory 1c (FIG. 1). Depending on whether the detected engine operating condition is the first, second or third condition, the corresponding stroke volume and the Fourier coefficient(s) are extracted from the memory 1c to calculate the indicated mean effective pressure in accordance with the equation (9).

When the detected current engine condition is between the first, second and third conditions, the stroke volume and the Fourier coefficient(s) can be calculated through interpolation. For example, when it is detected that the engine is between the first and second conditions, the values of the stroke volume and the Fourier coefficients Vb1, Va1, and Va2 that correspond to the detected engine operating condition can be calculated by interpolating between the values of the stroke volume Vs1 and the Fourier coefficients Vb1, Va1 and Va2 shown in (a2) and the values of the stroke volume Vs2 and the Fourier coefficient Vb1, Va1 and Va2 shown in (b2). In such interpolation, a value of zero can be set in the values of the Fourier coefficients Va1 and Va2 in the first condition. Similarly, for example, when it is detected that the engine is between the second and third conditions, the values of the stroke volume and the Fourier coefficients that correspond to the detected engine operating condition can be calculated by interpolating between the values of the stroke volume Vs2 and the Fourier coefficient Va1, Vb1 and Va2 shown in (b2) and the values of the stroke volume Vs3 and the Fourier coefficient Va1, Vb1 and Va2 shown in (c2). In such interpolation, a value of zero can be set in the values of the Fourier coefficients Va1 and Va2 in the third condition.

Figure 10:
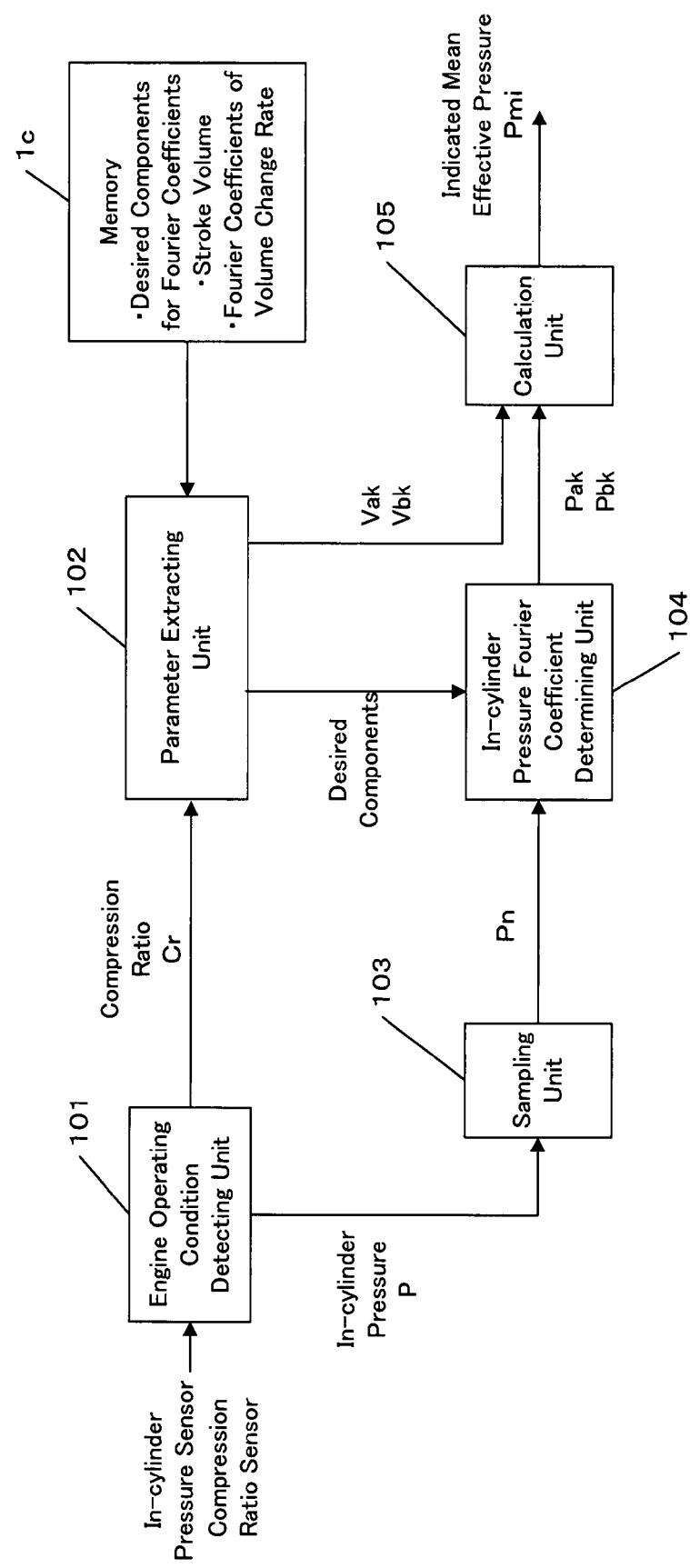
[FIG. 10] A block diagram of an apparatus for calculating an indicated mean effective pressure in accordance with one embodiment of the present invention.

FIG. 10 is a block diagram of an apparatus for calculating an indicated mean effective pressure in accordance with one embodiment of the present invention. Functional blocks 101-105 can be implemented in the ECU 1. Typically, these functions are implemented by one or more computer programs stored in the ECU 1. Alternatively, these functions may be implemented with hardware, software, firmware or any combination thereof.

Figure 11:
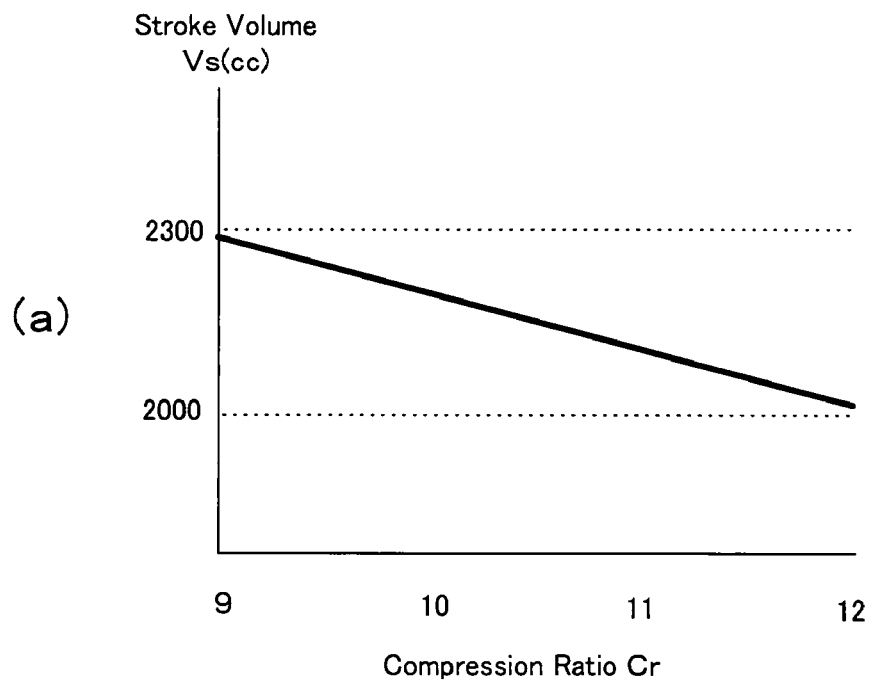
[FIG. 11] A map defining values of a stroke volume and Fourier coefficients corresponding to a compression ratio in accordance with one embodiment of the present invention.
Figure 11:
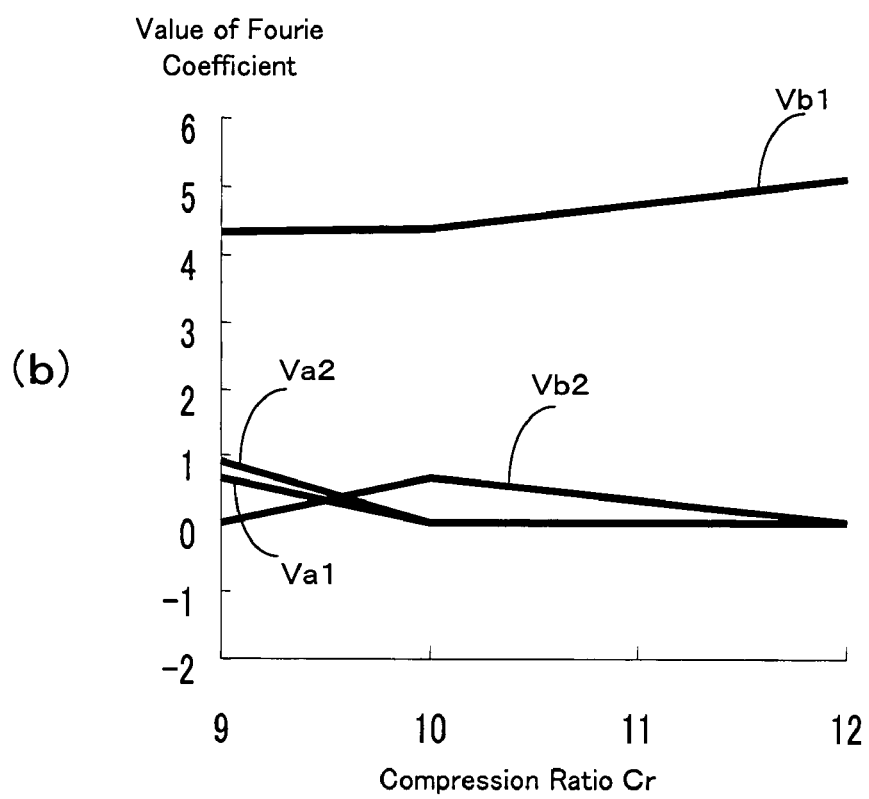

The memory 1c of the ECU 1 stores the stroke volume Vs and the volume change rate Fourier coefficients Vak and Vbk for desired components, all of which are pre-calculated corresponding to the compression ratio of the engine. FIG. 11(a) shows an example map defining the stroke volume Vs corresponding to the compression ratio Cr. FIG. 11(b) shows an example map defining the values of the Fourier coefficients Vak and Vbk for desired components corresponding to the compression ratio Cr.

An operating condition detecting unit 101 detects a current compression ratio Cr of the engine based on the output of the compression ratio sensor 27 (FIG. 1). A parameter extracting unit 102 refers to a map as shown in FIG. 11(b) based on the detected compression ratio Cr to determine desired components for the Fourier coefficients of the in-cylinder pressure and the volume change rate. In this example, only the Fourier coefficients Vb1, Vb2, Va1 and Va2 are defined in the map. Therefore, it is determined that the desired components are the first and second order sine components and the first and second order cosine components.

In determining the desired components, the parameter extracting unit 102 extracts, for the determined desired components, the values of the volume change rate Fourier coefficients Vak and Vbk corresponding to the detected compression ratio. In this example, Va1, Va2, Vb1 and Vb2 are extracted.

Alternatively, a map other than the map of FIG. 11(b) may be prepared for defining the types of the desired components corresponding to the compression ratio.

If the types of the desired components change in accordance with the compression ratio, the values of undesired components may be set to zero in the map. When referring to the map, a component having a value of zero can be determined as an undesired component. Alternatively, undesired components may not be defined in the map.

The parameter extracting unit 102 further refers to a map as shown in FIG. 11(a) to extract the stroke volume Vs corresponding to the detected compression ratio Cr.

The operating condition detecting unit 101 further determines an in-cylinder pressure P based on the output of the in-cylinder pressure sensor 15 (FIG. 1). A sampling unit 103 samples the in-cylinder pressure P in a predetermined cycle to acquire each sample Pn of the in-cylinder pressure. In one example, sampling is performed at every 30 degrees crank angle. Therefore, 2N in the equation (9) takes a value of 24, which is derived by 720/30 (one combustion cycle corresponds to 720 degrees crank angle). As described above, as long as the sampling theorem is satisfied, down-sampling can be performed in accordance with the desired components.

An in-cylinder pressure Fourier coefficient determining unit 104 receives the types of the desired components from the parameter extracting unit 102 to calculate the Fourier coefficients Pak and Pbk for the desired components. In this example, the desired components are the first and second order sine components and the first and second order cosine components. The unit 104 substitutes a sample Pn of the in-cylinder pressure into the Pak and Pbk calculation equations (see the equation (9)) to calculate Pa1, Pa2, Pb1 and Pb2.

A calculation unit 105 uses the Fourier coefficients Pak, Pbk of the in-cylinder pressure, the Fourier coefficients Vak, Vbk of the volume change rate and the stroke volume Vs to calculate the indicated mean effective pressure Pmi in accordance with the equation (9).

Alternatively, the parameter extracting unit 102 may refer to maps as shown in FIGS. 11(a) and 11(b) based on a target compression ratio. However, because the variable compression ratio mechanism that is capable of changing the compression ratio may have a delay, it is preferable that the Fourier coefficients of the volume change rate be determined based on the actual compression ratio.

In another embodiment, as described above, the Fourier coefficients Vak and Vbk of the volume change rate are calculated in real time in accordance with the equation (10) or (11). In this case, the volume change rate Vn corresponding to the detected compression ratio Cr is determined. For example, the volume change rate corresponding to the compression ratio can be pre-calculated and defined in a map. Such a map is stored in the memory. The map is referred to based on the detected compression ratio to determine the volume change rate Vn. Such determined Vn is substituted into the equation (10) or (11) to calculate the Fourier coefficients Vak and Vbk.

Figure 12:
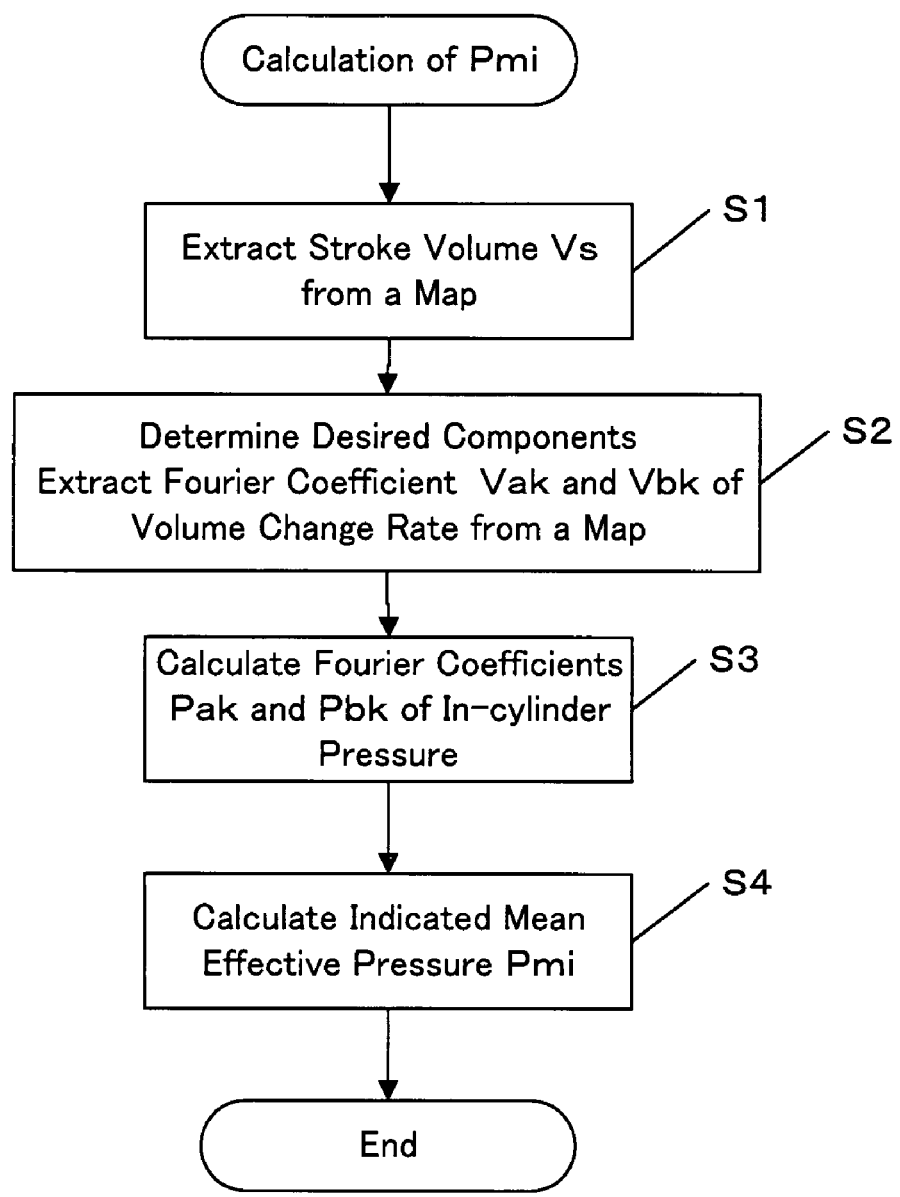
[FIG. 12] A flowchart of a process for calculating an indicated mean effective pressure in accordance with one embodiment of the present invention.

FIG. 12 is a flowchart of a process for calculating an indicated mean effective pressure in accordance with one embodiment of the present invention. This process is typically performed by one or more programs stored in the memory 1c (FIG. 1). This process is activated, for example, every time a TDC signal indicating the TDC in an intake stroke is issued.

In this embodiment, the indicated mean effective pressure is calculated for one combustion cycle immediately before the process is activated. During the combustion cycle, the in-cylinder pressure signal is sampled. As a result, 2N samples Pn of the in-cylinder pressure are acquired.

In step S1, a map as shown in FIG. 11(a) is referred to based on a compression ratio Cr detected in the combustion cycle to extract the stroke volume Vs. In step S2, a map as shown in FIG. 11(b) is referred to based on the detected compression ratio Cr to determine the types of the desired components and extract the Fourier coefficients Vak and Vbk of the volume change rate for the desired components.

In step S3, 2N samples Pn of the in-cylinder pressure are used to calculate the in-cylinder pressure Fourier coefficients Pak and Pbk for the desired components.

In step S4, based on the stroke volume Vs and the Fourier coefficients Vak and Vbk of the volume change rate extracted in steps S1 and S2 and the Fourier coefficients Pak and Pbk of the in-cylinder pressure extracted in step S3, the indicated mean effective pressure Pmi is calculated in accordance with the equation (9).

In an alternative embodiment, a reference value Vsref for the stroke volume Vs is first established. Then, R (=Vs/Vsref), which is a ratio of the stroke volume Vs to the established reference value Vsref is calculated corresponding to the compression ratio Cr. For example, in the example of FIG. 6, the ratio R that is determined corresponding to the compression ratio Cr can be used to calculate the indicated mean effective pressure Pmi in accordance with the equation (15).

$$Pmi = \frac{2N}{2R \cdot Vsref}(P_{a1}V_{a1} + P_{a2}V_{a2} + P_{b1}V_{b1} + P_{b2}V_{b2}) \quad (15)$$

$$Pak = \frac{2}{2N}\sum_{n=1}^{2N} P_n \cos k\frac{2\pi}{N}n$$

$$Pbk = \frac{2}{2N}\sum_{n=1}^{2N} P_n \sin k\frac{2\pi}{N}n$$

In yet another embodiment, a ratio between the Fourier coefficients of the volume change rate are pre-calculated in order to calculate the indicated mean effective pressure Pmi. For example, the equation (16) is derived from the equation (12).

$$W = \frac{Pmi}{V_{b1}} \quad (16)$$

$$= \frac{2N}{2Vs}\left(P_{b1} + P_{b2}\frac{V_{b2}}{V_{b1}}\right)$$

$$= \frac{1}{Vs}\left(\sum_{n=1}^{2N} P_n\left(\sin\frac{2\pi}{N}n + \sin2\frac{2\pi}{N}n \cdot \frac{V_{b2}}{V_{b1}}\right)\right)$$

-continued $$\text{where } Pbk = \frac{2}{2N}\sum_{n=1}^{2N} P_n \sin k\frac{2\pi}{N}n$$

As an example, assuming that Vb1:Vb2=1:0.2 is known in advance through the FFT analysis or the like, the equation (16) is simplified as shown by the equation (17).

$$W = \frac{Pmi}{V_{b1}} \quad (17)$$

$$= \frac{2N}{2Vs}\left(P_{b1} + P_{b2}\frac{V_{b2}}{V_{b1}}\right)$$

$$= \frac{1}{Vs}\left(\sum_{n=1}^{2N} P_n\left(\sin\frac{2\pi}{N}n + 0.2\sin2\frac{2\pi}{N}n \cdot\right)\right)$$

$$= \frac{1}{Vs}\sum_{n=1}^{2N} Pv$$

As seen from the equation (17), W is based on a correlation coefficient Pv between an in-cylinder pressure sample Pn and a predetermined sine function (sin(2 π/N) n+0.2 sin 2 (2 π/N) n). Because the stroke volume Vs and the Fourier coefficient Vb1 can be pre-determined as described above, the indicated mean effective pressure Pmi can be calculated by calculating the value of W. Thus, the indicated mean effective pressure Pmi can be calculated by calculating a single correlation coefficient Pv every time a sample Pn of the in-cylinder pressure is acquired.

In the above-described embodiments, the indicated mean effective pressure is calculated by using the Fourier coefficients of the in-cylinder pressure and the volume change rate that are calculated for one combustion cycle starting from the TDC in the intake stroke. In other words, the calculation interval for the Fourier coefficients is one combustion cycle starting from the TDC in the intake stroke. Alternatively, the calculation interval for the Fourier coefficients can be started at any time point.

Figure 13:
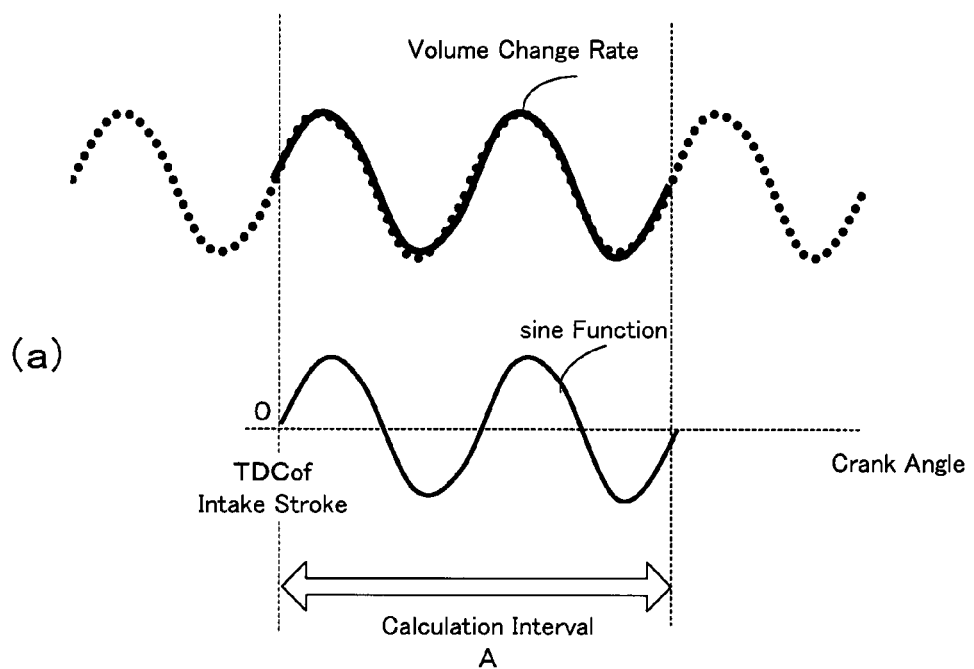
[FIG. 13] A diagram showing how to establish a calculation interval in accordance with one embodiment of the present invention.
Figure 13:
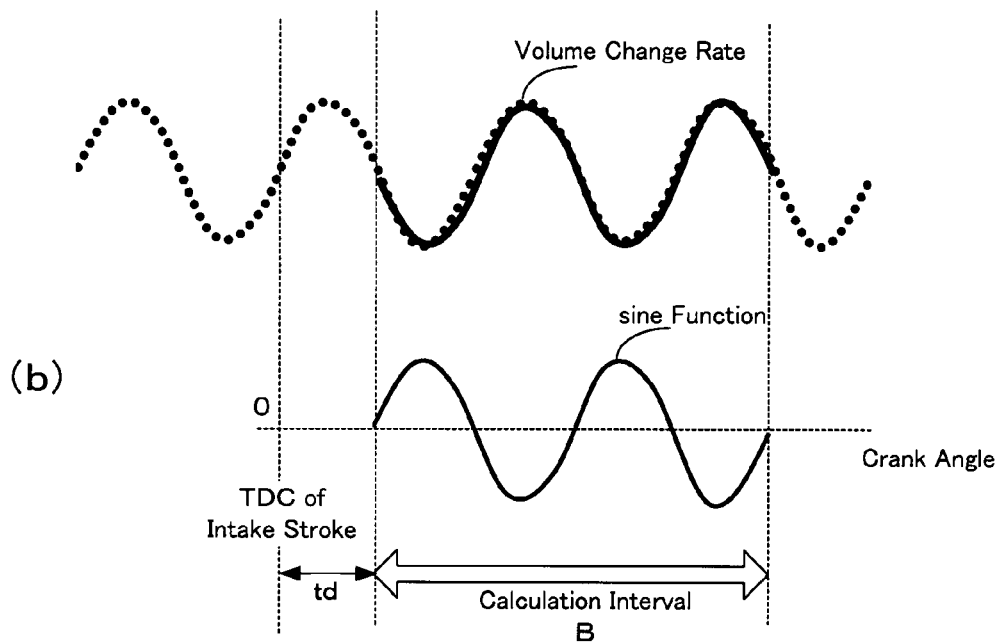

Referring to FIG. 13, (a) shows a case where the Fourier coefficients are calculated for the calculation interval A which is one combustion cycle starting from the TDC in the intake stroke as described above. The waveform of the sine function is established to have a value of zero at the start of the calculation interval. By setting the calculation interval in this way, the similarity between the waveform of the volume change rate and the waveform of the sine function is higher. Therefore, the number of components desired for calculating the indicated mean effective pressure can be reduced. In the example of (a), it is predicted that the desired components may be only sine component(s).

On the other hand, (b) shows a case where the calculation interval B starts at a time delayed by td from the TDC of the intake stroke. The calculation interval B has a length equal to one combustion cycle. Similarly to (a), the sine function is established to have a value of zero at the start of the calculation interval B. As seen from the figure, similarity between the waveform of the volume change rate and the waveform of the sine function is lower than (a). Accordingly, the number of components desired for calculating the indicated mean effective pressure is greater than (a). It is predicted that the desired components are not only sine components but also cosine components. Thus, the types of the desired components change. However, even if a calculation interval such as (b) is established, the indicated mean effective pressure can be calculated in accordance with the same technique as described above referring to FIGS. 3 through 7.

The present invention can be applied to a general-purpose internal combustion engine (such as an outboard motor or the like).

The invention claimed is:

1. An apparatus for calculating work of an engine, the apparatus comprising:
   desired component determining means for determining a frequency component desired for calculating the engine work, among frequency components obtained by frequency-resolving a volume change rate of the engine;
   first determination means for determining a first correlation coefficient between the volume change rate and a reference signal that consists of the desired frequency component;
   second determination means for determining a second correlation coefficient between an in-cylinder pressure of the engine and a reference signal that consists of the desired frequency component; and
   engine work calculating means for calculating the engine work based on the first correlation coefficient and the second correlation coefficient.

2. The apparatus of claim 1, wherein the first correlation coefficient is a Fourier coefficient that is obtained by expanding the volume change rate into Fourier series and the second correlation coefficient is a Fourier coefficient that is obtained by expanding the in-cylinder pressure into Fourier series.

3. The apparatus of claim 1, further comprising:
   a mechanism for changing a stroke volume of the engine; and
   stroke volume determining means for determining the stroke volume,
   wherein the engine work calculating means calculates the engine work based on the determined stroke volume, the first correlation coefficient and the second correlation coefficient.

4. The apparatus of claim 3, further comprising:
   storage means for storing a stroke volume that is predetermined corresponding to an operating condition of the engine; and
   means for detecting an operating condition of the engine,
   wherein the stroke volume determining means refers to the storage means based on the detected operating condition of the engine to extract the stroke volume corresponding to the detected operating condition.

5. The apparatus of claim 1, further comprising means for detecting an operating condition of the engine,
   wherein the desired component determining means determines the desired frequency component based on the detected operating condition of the engine.

6. The apparatus of claim 5, wherein the engine includes a mechanism that is capable of changing a compression ratio of the engine; and
   wherein the operating condition of the engine includes the compression ratio of the engine.

7. The apparatus of claim 1, further comprising:
   storage means for storing a desired component and a first correlation coefficient that are predetermined corresponding to an operating condition of the engine; and
   means for detecting an operating condition of the engine,
   wherein the desired component determining means refers to the storage means based on the detected operating condition of the engine to extract the desired component corresponding to the detected operating condition; and
   wherein the first determination means refers to the storage means based on the detected operating condition of the engine to extract the first correlation coefficient corresponding to the detected operating condition.

8. The apparatus of claim 1, further comprising means for detecting an in-cylinder pressure of the engine,
   wherein the second determination means calculates the second correlation coefficient based on the detected in-cylinder pressure in accordance with a predetermined equation.

9. The apparatus of claim 1, further comprising:
   storage means for storing, for the desired components and the first correlation coefficient corresponding to the desired component, a first component in a first operating condition of the engine and a first correlation coefficient corresponding to the first component and a second component in a second operating condition of the engine and a first correlation coefficient corresponding to the second component; and
   means for detecting an operating condition of the engine,
   wherein if the engine operating condition detected by the means for detecting an operating condition of the engine is between the first condition and the second condition, the first determination means determines the first correlation coefficient corresponding to the detected operating condition of the engine by interpolating between the first correlation coefficient corresponding to the first component and the first correlation coefficient corresponding to the second component.

10. The apparatus of claim 9, further comprising:
    storage means for storing, for a stroke volume of the engine, a first stroke volume in the first operating condition of the engine and a second stroke volume in the second operating condition of the engine; and
    means for determining a stroke volume corresponding to the detected operating condition of the engine by interpolating between the first stroke volume and the second stroke volume if the engine operating condition detected by the means for detecting an operating condition of the engine is between the first condition and the second condition,
    wherein the engine work calculating means calculates the engine work based on the determined stroke volume, the first correlation coefficient and the second correlation coefficient.

11. The apparatus of claim 1, further comprising means for detecting an operating condition of the engine,
    wherein the first determination means determines the volume change rate corresponding to the detected operating condition of the engine and calculates the first correlation coefficient based on the determined volume change rate in accordance with a predetermined equation.

12. The apparatus of claim 1, wherein the engine work comprises an indicated mean effective pressure.

13. An apparatus for calculating work of an engine, the apparatus comprising a control unit configured to:
    determine a frequency component desired for calculating the engine work, among frequency components obtained by frequency-resolving a volume change rate of the engine;
    determine a first correlation coefficient between the volume change rate and a reference signal that consists of the desired frequency component;
    determine a second correlation coefficient between an in-cylinder pressure of the engine and a reference signal that consists of the desired frequency component; and calculate the engine work based on the first correlation coefficient and the second correlation coefficient.

14. The apparatus of claim 13, wherein the first correlation coefficient is a Fourier coefficient that is obtained by expanding the volume change rate into Fourier series and the second correlation coefficient is a Fourier coefficient that is obtained by expanding the in-cylinder pressure into Fourier series.

15. The apparatus of claim 13, further comprising a mechanism for changing a stroke volume of the engine; and
wherein the control unit is further configured to:
determine the stroke volume; and
calculate the engine work based on the determined stroke volume, the first correlation coefficient and the second correlation coefficient.

16. The apparatus of claim 15, wherein the control unit comprises a storage unit for storing a stroke volume that is predetermined corresponding to an operating condition of the engine; and
wherein the control unit is further configured to:
detect an operating condition of the engine; and
refer to the storage unit based on the detected operating condition of the engine to extract the stroke volume corresponding to the detected operating condition.

17. The apparatus of claim 13, wherein the control unit is further configured to:
detect an operating condition of the engine; and
determine the desired frequency component based on the detected operating condition of the engine.

18. The apparatus of claim 17, wherein the engine includes a mechanism that is capable of changing a compression ratio of the engine; and
wherein the operating condition of the engine includes the compression ratio of the engine.

19. The apparatus of claim 13, wherein the control unit comprises a storage unit for storing a desired component and a first correlation coefficient that are predetermined corresponding to an operating condition of the engine; and
wherein the control unit is further configured to:
detect an operating condition of the engine;
refer to the storage unit based on the detected operating condition of the engine to extract the desired component corresponding to the detected operating condition and
refer to the storage unit based on the detected operating condition of the engine to extract the first correlation coefficient corresponding to the detected operating condition.

20. The apparatus of claim 13, further comprising a unit for detecting an in-cylinder pressure of the engine,
wherein the control unit is further configured to calculate the second correlation coefficient based on the detected in-cylinder pressure in accordance with a predetermined equation.

21. The apparatus of claim 13, further comprising:
a storage unit for storing, for the desired components and the first correlation coefficient corresponding to the desired component, a first component in a first operating condition of the engine and a first correlation coefficient corresponding to the first component and a second component in a second operating condition of the engine and a first correlation coefficient corresponding to the second component; and
wherein the control unit is further configured to:
detect an operating condition of the engine; and
if the engine operating condition thus detected is between the first condition and the second condition, determine the first correlation coefficient corresponding to the detected operating condition of the engine by interpolating between the first correlation coefficient corresponding to the first component and the first correlation coefficient corresponding to the second component.

22. The apparatus of claim 21, further comprising:
a storage unit for storing, for a stroke volume of the engine, a first stroke volume in the first operating condition of the engine and a second stroke volume in the second operating condition of the engine; and
wherein the control unit is further configured to:
determine a stroke volume corresponding to the detected operating condition of the engine by interpolating between the first stroke volume and the second stroke volume if the detected engine operating condition is between the first condition and the second condition; and
calculate the engine work based on the determined stroke volume, the first correlation coefficient and the second correlation coefficient.

23. The apparatus of claim 13, wherein the control unit is further configured to:
detect an operating condition of the engine;
determine the volume change rate corresponding to the detected operating condition of the engine; and
calculate the first correlation coefficient based on the determined volume change rate in accordance with a predetermined equation.

24. The apparatus of claim 13, wherein the engine work comprises an indicated mean effective pressure.

25. A method for calculating work of an engine, comprising:
(a) determining a frequency component desired for calculating the engine work, among frequency components obtained by frequency-resolving a volume change rate of the engine;
(b) determining a first correlation coefficient between the volume change rate and a reference signal consisting of the desired frequency component;
(c) determining a second correlation coefficient between an in-cylinder pressure of the engine and a reference signal consisting of the desired frequency component; and
(d) calculating the engine work based on the first correlation coefficient and the second correlation coefficient.

26. The method of claim 25, wherein the first correlation coefficient is a Fourier coefficient obtained by expanding the volume change rate into Fourier series and the second correlation coefficient is a Fourier coefficient obtained by expanding the in-cylinder pressure into Fourier series.

27. The method of claim 25, further comprising determining a stroke volume of the engine,
wherein the step (d) further includes calculating the engine work based on the stroke volume, the first correlation coefficient and the second correlation coefficient.

28. The method of claim 27, further comprising:
providing a storage device for storing a stroke volume predetermined corresponding to an operating condition of the engine; and
detecting an operating condition of the engine,
wherein said step for determining a stroke volume includes referring to the storage device based on the detected operating condition of the engine to extract the stroke volume corresponding to the detected operating condition of the engine.

29. The method of claim 25, further comprising detecting an operating condition of the engine, wherein the step (a) includes determining the desired component based on the detected operating condition of the engine.

30. The method of claim 29, wherein the engine includes a mechanism that is capable of changing a compression ratio of the engine; and
wherein the operating condition of the engine includes the compression ratio of the engine.

31. The method of claim 25, further comprising:
providing a storage device for storing the desired component and the first correlation coefficient that are predetermined corresponding to an operating condition of the engine; and
detecting an operating condition of the engine,
wherein the step (a) includes referring to the storage device based on the detected operating condition of the engine to extract the desired component corresponding to the detected operating condition of the engine; and
wherein said step (b) includes referring to the storage device based on the detected operating condition of the engine to extract the first correlation coefficient corresponding to the detected operating condition of the engine.

32. The method of claim 25, further comprising detecting an in-cylinder pressure of the engine,
wherein the step (c) includes calculating the second correlation coefficient based on the detected in-cylinder pressure in accordance with a predetermined equation.

33. The method of claim 25, further comprising:
providing a storage device for storing, for the desired component and the first correlation coefficient corresponding to the desired component, a first component in a first operating condition of the engine and a first correlation coefficient corresponding to the first component, and a second component in a second operating condition of the engine and a first correlation coefficient corresponding to the second component; and
detecting an operating condition of the engine,
wherein if the detected operating condition is between the first operating condition and the second operating condition, the step (b) determines the first correlation coefficient corresponding to the detected operating condition of the engine by interpolating between the first correlation coefficient corresponding to the first component and the first correlation coefficient corresponding to the second component.

34. The method of claim 33, further comprising:
providing a storage device for storing, for a stroke volume of the engine, a first stroke volume in the first operating condition of the engine and a second stroke volume in the second operating condition of the engine; and
determining a stroke volume corresponding to the detected operating condition of the engine by interpolating between the first stroke volume and the second stroke volume if the detected engine operating condition is between the first condition and the second condition,
wherein the step (d) calculates the engine work based on the determined stroke volume, the first correlation coefficient and the second correlation coefficient.

35. The method of claim 25, further comprising detecting an operating condition of the engine,
wherein said step (b) includes determining the volume change rate corresponding to the detected operating condition of the engine and calculating the first correlation coefficient based on the determined volume change rate in accordance with a predetermined equation.

36. The method of claim 25, wherein the engine work includes an indicated mean effective pressure.

* * * * *